(12) United States Patent
Matsubara et al.

(10) Patent No.: US 7,649,443 B2
(45) Date of Patent: Jan. 19, 2010

(54) ANTITHEFT APPARATUS

(75) Inventors: Manabu Matsubara, Kobe (JP);
Minoru Yoshimura, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 348 days.

(21) Appl. No.: 11/713,030

(22) Filed: Mar. 2, 2007

(65) Prior Publication Data
US 2007/0205878 A1    Sep. 6, 2007

(30) Foreign Application Priority Data
Mar. 6, 2006    (JP) ............... 2006-060149

(51) Int. Cl.
*B60R 25/10*    (2006.01)
(52) U.S. Cl. ............... 340/426.29; 340/430; 340/426.1; 340/426.14
(58) Field of Classification Search ............ 340/426.1, 340/426.29, 429, 430, 426.14, 5.72, 545.1, 340/686.1, 568.8
See application file for complete search history.

(56) References Cited

U.S. PATENT DOCUMENTS 4,754,255 A * 6/1988 Sanders et al. ............ 307/10.4
5,160,914 A * 11/1992 Sato ....................... 340/426.17
2005/0174218 A1* 8/2005 Jordan et al. ............. 340/426.1

FOREIGN PATENT DOCUMENTS

| JP | A-61-175142 | 8/1986 |
|---|---|---|
| JP | A-04-078751 | 3/1992 |
| JP | U-05-035518 | 5/1993 |
| JP | B-07-005063 | 1/1995 |
| JP | A-2006-236171 | 9/2006 |

* cited by examiner

*Primary Examiner*—George A Bugg
*Assistant Examiner*—Hongmin Fan
(74) *Attorney, Agent, or Firm*—Oliff & Berridge, PLC

(57) ABSTRACT

An antitheft apparatus includes a control section. When a status change from a closed state to an open state of a luggage door caused by regular means is detected in an arming state being ready to output an alarm, the control section shifts a status from the arming state to a disarmed state being not ready to output an alarm; when a status change from the open state to the closed state of the luggage door is detected in the disarmed state, the control section shifts the status from the disarmed state to the arming state after a predetermined length of preparatory period; and when an arming command to shift the status from the disarmed state to the arming state is given within the length of preparatory period, the control section shifts the status from the disarmed state to the arming state.

7 Claims, 19 Drawing Sheets

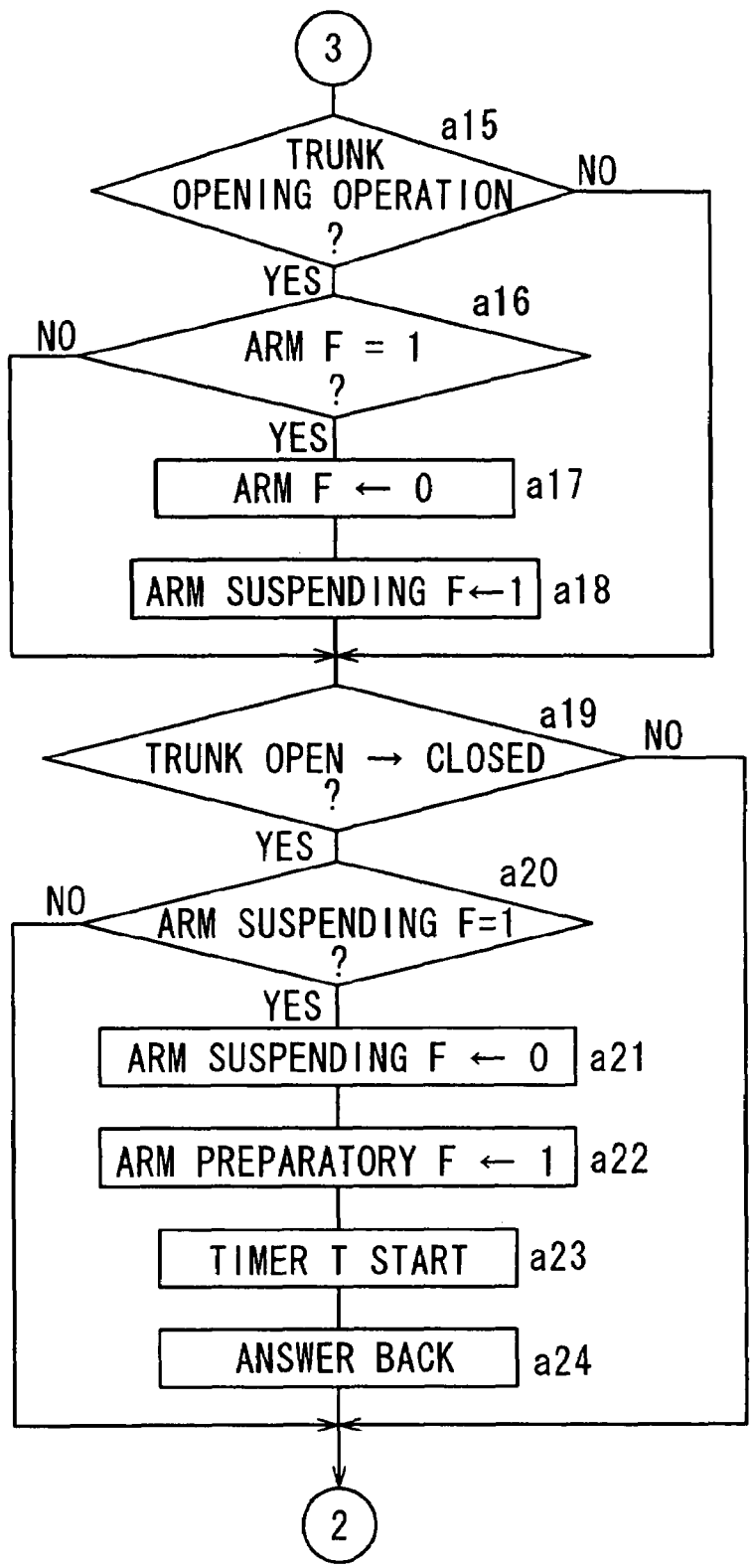

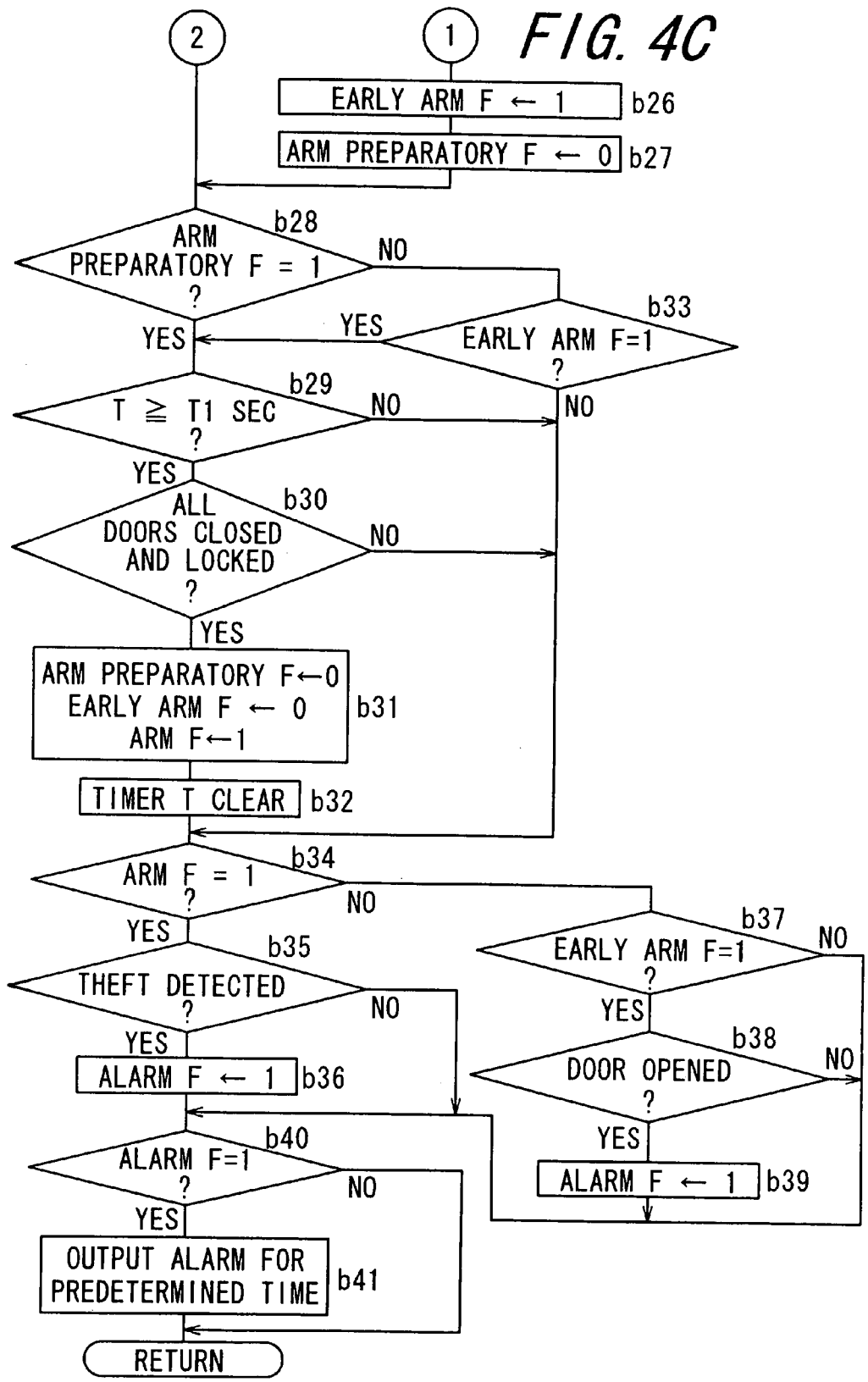

FIG. 10 (WITH T1 PLUS-MODIFIED)
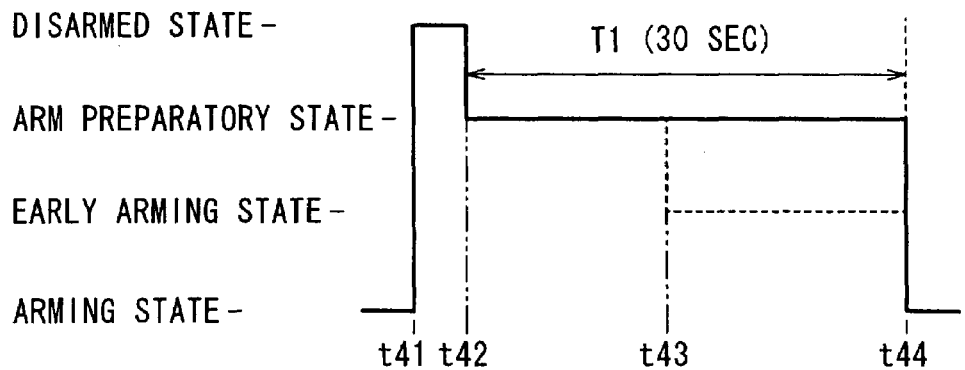
FIG. 11 (WITH T1 MINUS-MODIFIED)
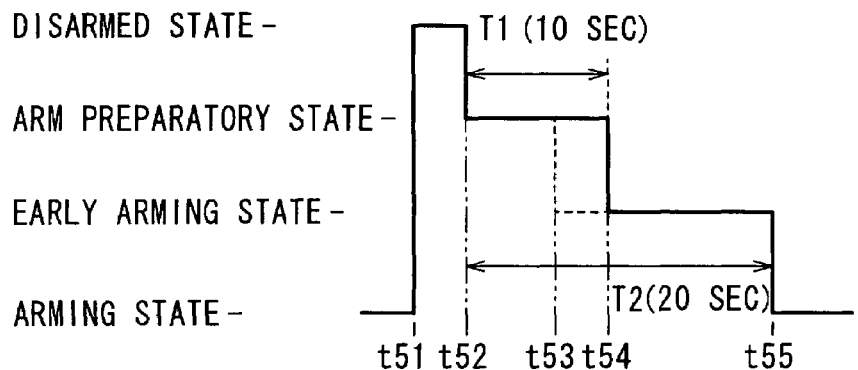

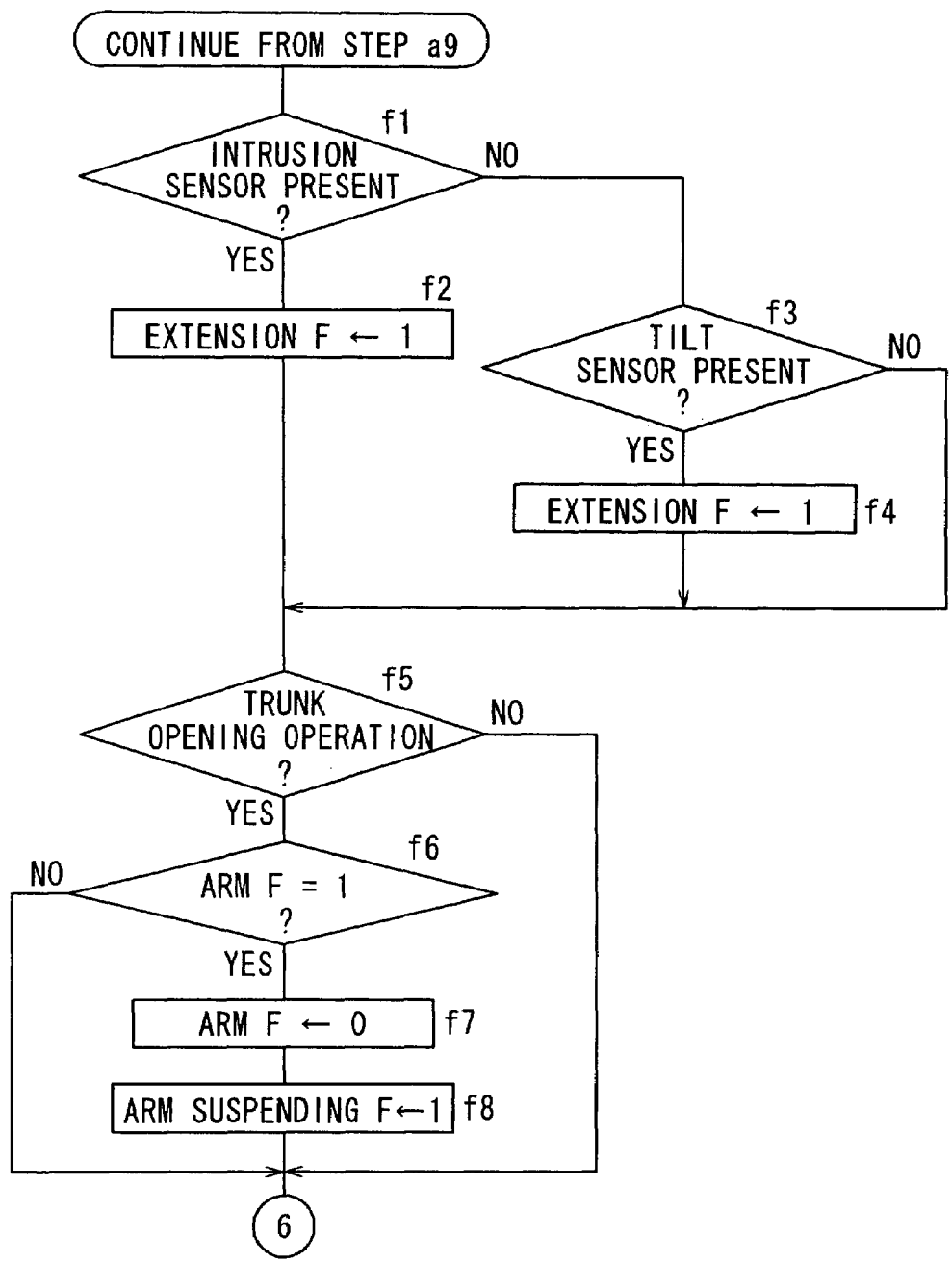

ANTITHEFT APPARATUS

BACKGROUND OF THE INVENTION

1. Field of the Invention

The present invention relates to an antitheft apparatus for preventing an object to be protected against theft from being stolen.

2. Description of the Related Art

A conventional antitheft apparatuses is so designed as to function when its mode is set to an arming mode, i.e. an alert status where an antitheft function works. For example, in the case of an antitheft apparatus for a vehicle, the antitheft function works by means of a transmitter or the like when a user of the vehicle is leaving it. In the arming mode, an alarm is issued even when the user opens a trunk of the vehicle to get a baggage into or from the trunk. Accordingly, in the case where the user opens the trunk, for example, in order to get a baggage thereinto or therefrom, it is usual that the user once changes over the mode to a disarmed mode, i.e. a non-alert status where the antitheft function is suspended. And when the user desires to change over the mode to the arming mode again, the changeover thereto is carried out by operating the transmitter by the user after closing the trunk.

Japanese Unexamined Patent Publication JP-A 4-78751 (1992) discloses a technique for eliminating such a user's troublesome operation of setting to the arming mode again. An antitheft apparatus for automobile disclosed in the publication is configured such that opening a trunk of an automobile in the arming mode by using a key causes the alert status to be temporarily released, that is, causes temporarily setting to the disarmed mode, and then closing the trunk effects automatically shifting to the alert status. It is thus not necessary to conduct a series of operations, namely, shifting the status to a non-alert status once for opening the trunk and then, shifting the status from the non-alert status to the alert status again subsequent to closure of the trunk, shift the status from the non-alert status to the alert status.

The above-described antitheft apparatus may be provided with a sensor of which output is influenced by a change of vehicle weight, an external force on the vehicle, and vibration of the vehicle. The sensor includes, for example, a vibration sensor for detecting a vibration of a vehicle body; an intrusion sensor for detecting an intrusion into a vehicle interior; and a sensor of which output changes in response to motion of an object placed in the vehicle interior attributable to a vibration generated by a change of vehicle weight, an external force and other causes. In the case where the antitheft apparatus is provided with a sensor as stated above, changing over to the arming mode immediately after closure of the trunk may possibly issue an error alarm because the vehicle body continues to vibrate for a short while even after the closure of the trunk. The conventional antitheft apparatus thus has a problem that a theft action cannot be precisely detected.

Further, the antitheft apparatus may be provided with a tilt sensor for detecting an inclined vehicle body angle. In this case, a vehicle body angle in a vehicle-parked state is set as a default angle. However, resetting of a default angle is necessary after getting a baggage into or from the trunk. Accordingly, in order to secure precise detection of a theft action, the user usually waits for the vehicle body to stop vibrating after the closure of the trunk and then carries out the reset of default angle.

In order to solve the problems described above, JP-A 4-78751 discloses a technique of an antitheft apparatus which is designed to effect automatic shifting to the arming mode after an elapse of a predetermined length of time following the closure of the trunk. This constitution allows the arming mode to be set after the halt of vibration following the closure of the trunk so that the error alarm due to the vibration of vehicle body can be prevented.

The sensor (which hereinafter may be collectively referred to as "security sensor") of which output is influenced by the vibration of vehicle, such as the tilt sensor, the vibration sensor, and the intrusion sensor, is frequently set as optional elements. The theft action may be thus detected through only an antitheft function which is not influenced by the vibration of vehicle, such as a door courtesy switch, a hood switch, or a trunk switch. In such a case, the setting of the arming mode immediately after the closure of the trunk poses no problem. In order to define timing of setting the arming mode after the closure of the trunk, there are two options: the first option is to preset either of an antitheft apparatus having the security sensor and an antitheft apparatus having no security sensor; and the second option is that only the antitheft apparatus having the security sensor is preset and during duration of a predetermined length of time following the closure of the trunk, a user needs to tolerate the disarmed mode. The first option requires manufacture of two antitheft apparatuses, thus resulting in increase of production cost. The second option cannot eliminate unnecessary disarmed mode for a predetermined length of time after the closure of the trunk, thus causing a problem with security for such a period.

SUMMARY OF THE INVENTION

An object of the invention is therefore to provide an antitheft apparatus capable of ensuring security regardless of presence or absence of a sensor of which output is influenced by vibration of an object to be protected against theft.

The invention provides an antitheft apparatus comprising a control section that conducts control of outputting an alarm when a theft is detected by a theft detecting section for detecting a theft of an object, wherein, when a status change from a closed state to an open state of a luggage door caused by regular means is detected in an arming state being ready to output an alarm, the control section shifts a status from the arming state to a disarmed state being not ready to output an alarm;

when a status change from an open state to a closed state of a luggage door caused by regular means is detected in the disarmed state, the control section shifts the status from the disarmed state to the arming state after a predetermined length of preparatory period; and when an arming command to shift the status from the disarmed state to the arming state is given within the predetermined length of preparatory period, the control section shifts the status from the disarmed state to the arming state.

According to the invention, when the status change from a closed state to an open state of a luggage door caused by regular means is detected in the arming state, the control section conducts control of shifting the status from the arming state to the disarmed state. This allows a user of the object to have the luggage door opened without the operation for changing the status from the arming state to the disarmed state.

Further, when the status change from an open state to a closed state of a luggage door is detected in the disarmed state, the control section conducts control of shifting the status from the disarmed state to the arming state after the elapse of the predetermined length of preparatory period, and when the arming command is given within the predetermined length of preparatory period, the control section conducts control of shifting the status from the disarmed state to the arming state. Accordingly, in a case where no arming command is given within the predetermined length of preparatory period after the status change of the luggage door to the closed state, the status is, so to speak, automatically shifted from the disarmed state to the arming state. Furthermore, the arming state can be set by the user's arming command given within the predetermined length of preparatory period so that the user can set the arming state at a desired moment even within the predetermined length of preparatory period.

According to the invention, even in a case where the antitheft apparatus is provided with a theft detecting section of which output is influenced, for example, by vibration of the object to be protected against theft, the object to be protected against theft will stand still after the elapse of the predetermined length of preparatory period, with the result that an undesired output of alarm can be prevented even when the arming state is set. Setting to the arming state can be thus secured only by an operation of moving the luggage door to its closed state but without any particular operations of the user. Further, in a case where the antitheft apparatus does not include the theft detecting section of which output is influenced, for example, by vibration of the object to be protected against theft, the predetermined length of preparatory period is not necessary. Anyway, the arming state can be set by the user's arming command even within the predetermined length of preparatory period so that the security within the predetermined length of preparatory period can be ensured. Consequently, the security on an object to be protected against theft can be ensured by one antitheft apparatus regardless of presence or absence of the theft detecting section of which output is influenced by vibration of the object to be protected against theft. The antitheft apparatus can be thus enhanced in versatility and reduced in production cost.

In the invention, it is preferable that the theft detecting section comprises a vibration detecting section of which output is influenced by vibration of the object to be protected against theft, wherein, when the arming state is set within the predetermined length of preparatory period based on the arming command, the control section invalidates a value detected by the vibration detecting section during duration of a period until an elapse of the predetermined length of preparatory period.

In the invention, it is preferable that the theft detecting section comprises a door detecting section for detecting an open state and a closed state of a door, wherein, when a status change from a closed state to an open state of the door is detected by the door detecting section within the predetermined length of preparatory period, the control section conducts control of outputting an alarm.

In the invention, it is preferable that the control section conducts control of outputting an alarm which is different from a period during duration of the predetermined length of preparatory period to a period after an elapse of the predetermined length of preparatory period.

In the invention, it is preferable that the predetermined length of preparatory period is changeable.

In the invention, it is preferable that the theft detecting section comprises a vibration detecting section of which output is influenced by vibration of the object to be protected against theft, wherein, in a case where the predetermined length of preparatory period has been modified to be shorter than a predetermined default period, the control section invalidates a value detected by the vibration detecting section during duration of a period until an elapse of the default period when the arming state is set within the predetermined length of preparatory period based on the arming command.

In the invention, it is preferable that, in a case where the predetermined length of preparatory period has been modified to be shorter than a predetermined default period, the control section conducts control of outputting an alarm which is different from a period during duration of the predetermined length of preparatory period to a period after an elapse of the predetermined length of preparatory period.

The invention provides an antitheft apparatus comprising:

a control section that conducts control of outputting an alarm when a theft is detected by a theft detecting section for detecting a theft; and a connection detecting section that detects whether or not a vibration detecting section of which output is influenced by vibration of an object to be protected against theft is connected to the control section, wherein, when a status change from a closed state to an open state of a door caused by regular means is detected in an arming state being ready to output an alarm, the control section shifts a status from the arming state to a disarmed state being not ready to output an alarm;

in a case where connection between the vibration detecting section and the control section is detected by the connection detecting section, the control section shifts the status from the disarmed state to the arming state after an elapse of a first length of preparatory period when a status change from an open state to a closed state of the door is detected in the disarmed state; and in a case where no connection between the vibration detecting section and the control section is detected by the connection detecting section, the control section shifts the status from the disarmed state to the arming state after an elapse of a second length of preparatory period which is shorter than the first predetermined length of preparatory period when the status change from an open state to a closed state of the door is detected in the disarmed state.

BRIEF DESCRIPTION OF THE DRAWINGS

Other and further objects, features, and advantages of the invention will be more explicit from the following detailed description taken with reference to the drawings wherein:

FIGS. 2A through 2C are flowcharts showing a process conducted by an antitheft ECU of a vehicle-mounted apparatus;

FIGS. 4A through 4C are flowcharts showing a process conducted by an antitheft ECU of a vehicle-mounted apparatus provided in an antitheft apparatus according to a second embodiment of the invention;

FIG. 10 is a timing chart for explaining operations of the antitheft ECU, showing one example with a prolonged length of preparatory period T1;

FIG. 11 is a timing chart for explaining operations of the antitheft ECU, showing one example with a shortened length of preparatory period T1;

FIGS. 12A and 12B are flowcharts showing a process conducted by an antitheft ECU of a vehicle-mounted apparatus mounted in an antitheft apparatus according to a fifth embodiment of the invention;

DETAILED DESCRIPTION

Figure 1:
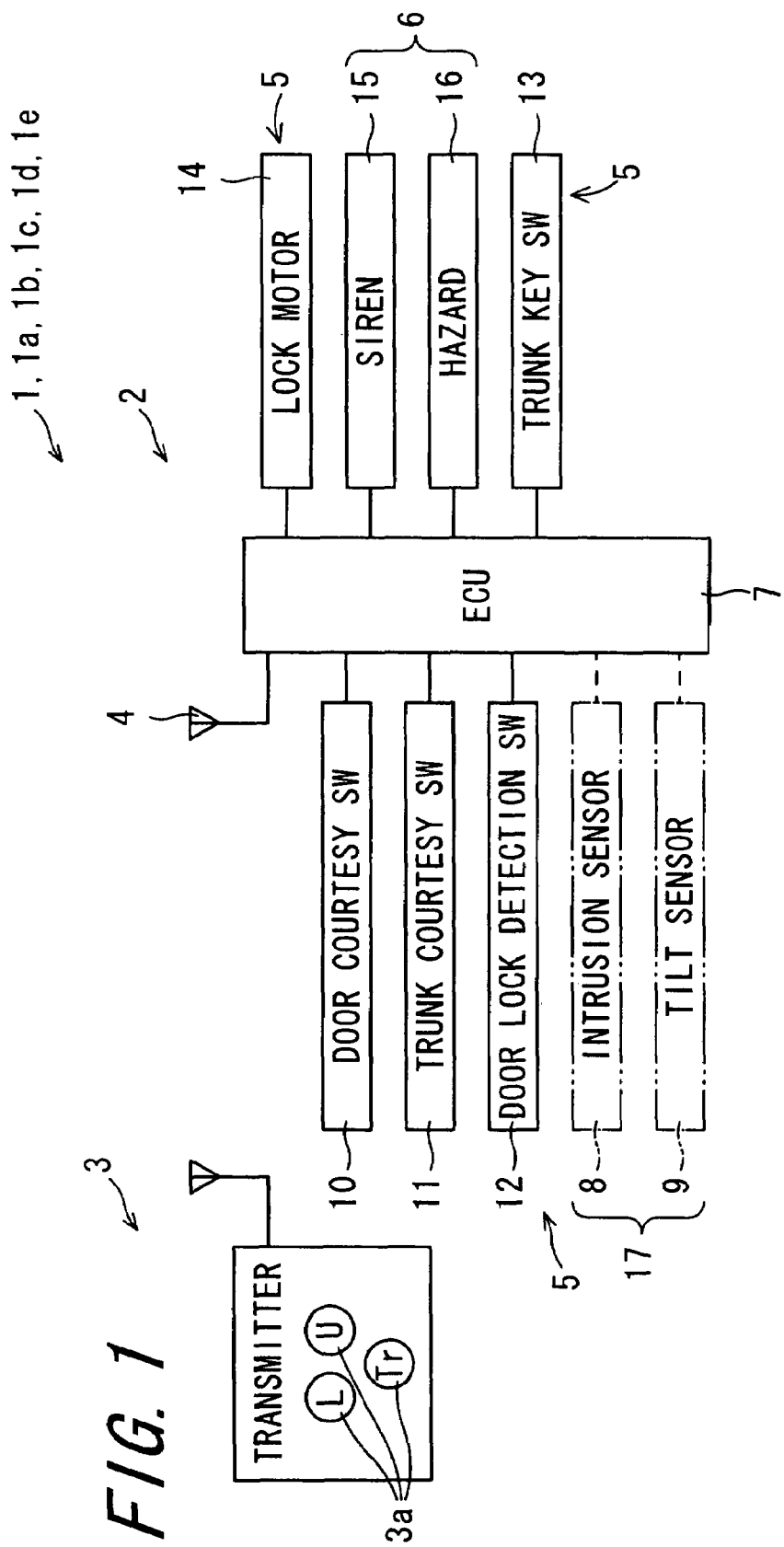
FIG. 1 is a block diagram showing an electrical configuration of an antitheft apparatus according to a first embodiment of the invention.

Now referring to the drawings, preferred embodiments of the invention are described below.

Hereinafter, a plurality of embodiments for implementing the invention are described with reference to the drawings. In the respective embodiments, parts corresponding to the matters described in the preceding embodiment are denoted by the same reference numerals or symbols, and overlapping description thereof may be omitted. When only a part of the configuration is described, the rest of the configuration of the embodiment is similar to that of the preceding embodiment. The invention is not limited to the combinations of parts described in the respective embodiments, and parts of two or more embodiments may be combined with one another as long as the combination does not cause a particular problem. The starting conditions in the respective flowcharts are not necessarily limited to the stated starting conditions.

FIG. 1 is a block diagram showing an electrical configuration of an antitheft apparatus 1 according to a first embodiment of the invention. With reference to FIG. 1, the later-described antitheft apparatuses 1, 1a, 1b, 1c, 1d, and 1e according to first to sixth embodiments of the invention will be described. The antitheft apparatus 1 is mounted on an object to be protected against theft to prevent the object to be protected against theft itself or members provided in the object to be protected against theft from being stolen. In the present embodiment, the object to be protected against theft is a vehicle, and the antitheft apparatus 1 is thus realized as a vehicle antitheft apparatus. Accordingly, the antitheft apparatus 1 of the embodiment is mounted in a vehicle, and prevents the vehicle itself, vehicle components such as a tire and an engine, things placed inside the vehicle, etc. from being stolen. The antitheft apparatus 1 comprises a vehicle-mounted apparatus 2 which is mounted in the vehicle, and a transmitter 3 which allows a remote operation of the vehicle-mounted apparatus 2 from a position distanced away from the vehicle. The vehicle-mounted apparatus 2 will be first described and then, the transmitter 3 will be described.

The vehicle-mounted apparatus 2 comprises a receiving portion 4 for receiving a command transmitted from the transmitter 3, a sensor portion 5 for detecting a status of the vehicle, an alarm output portion 6 for outputting an alarm, and an antitheft electronic control unit (abbreviated as ECU) 7 for controlling the respective portions. Further, the vehicle-mounted apparatus 2 of the embodiment does not include a vibration detecting section 17 such as an intrusion sensor 8 and a tilt sensor 9, of which output is influenced by vibration of the vehicle. Note that in FIG. 1, the intrusion sensor 8 and the tilt sensor 9 are virtually shown in order to use the drawing in common for explaining the later-described antitheft apparatuses 1a to 1e according to the second to sixth embodiments. Note that the vibration detecting section indicates any sensor of which output may possibly change attributable to vibration generated by a change of vehicle weight, an external force on a vehicle, and other causes. Thus, the vibration detection section is not limited to only commonly-used vibration sensors which are designed merely for detection of vibration.

The receiving portion 4 receives a command transmitted from the transmitter 3 and gives the received command to the antitheft ECU 7. The sensor portion 5 detects the status of the vehicle such as open/closed state and locked/unlocked state of a trunk or door of the vehicle, and gives the detected information to the antitheft ECU 7. The sensor portion 5 is composed of a door courtesy switch 10, a trunk courtesy switch 11, a door lock detection switch 12, a trunk key switch 13, and a door lock motor 14.

The door courtesy switch 10 is a door detecting section which detects information according to opening and closing of passengers' doors such as front and rear doors (hereinafter, may be simply referred to as "door"), and gives the detected information to the antitheft ECU 7. The trunk courtesy switch 11 detects information according to opening and closing of a trunk which is a luggage door of the vehicle, and gives the detected information to the antitheft ECU 7.

The door lock detection switch 12 detects information according to whether or not the door has been locked, and gives the detected information to the antitheft ECU 7. The trunk key switch 13 detects information according to whether or not the trunk has been unlocked by a trunk key for opening and closing the trunk, and gives the detected information to the antitheft ECU 7.

The door lock motor 14 is controlled by the antitheft ECU 7. On the basis of a command given by the antitheft ECU 7, the door lock motor 14 locks an open door to thereby shift the door status from the open state to the closed state, and unlocks a closed door to thereby shift the door status from the closed state to the open state.

The alarm output portion 6 outputs an alarm based on a command given by the antitheft ECU 7. The alarm output portion 6 includes a siren 15 and a hazard lamp 16. The siren 15 is controlled by the antitheft ECU 7. On the basis of a command given by the antitheft ECU 7, the siren 15 outputs an alarm which is a beep tone. The hazard lamp 16 is controlled by the antitheft ECU 7. On the basis of a command given by the antitheft ECU 7, the hazard lamp 16 puts on a warning light.

The antitheft ECU 7 is a control section which controls various parts by giving commands to those parts based on information given by those parts. The antitheft ECU 7 is realized by, for example, a processing circuit such as a microprocessor. The antitheft ECU 7 receives information which is used for distinguishing whether the trunk and doors are locked or unlocked while the ignition is OFF.

The antitheft ECU 7 determines whether or not an identification code of the command which has been transmitted from the transmitter 3 and received by the receiving portion 4, corresponds to a predetermined identification code. When it is determined that the identification code of the command corresponds to the predetermined identification code, the antitheft ECU 7 controls the various parts in accordance with the command including, for example, a door lock command, an unlock command, and a trunk open command. And when it is determined that the identification code of the command does not correspond to the predetermined identification code, the antitheft ECU 7 ignores the command. In the case of the door lock command, the antitheft ECU 7 locks all doors and simultaneously sets an arming state in which a vehicle theft action is monitored. Further, in the case of the unlock command, the antitheft ECU 7 unlocks all doors and simultaneously sets a disarmed state in which the monitoring of the vehicle theft action is lifted. Moreover, in the case of the trunk open command, the antitheft ECU 7 unlocks the trunk. Note that when the trunk key switch 13 detects that the trunk has been unlocked in the arming state by regular means, that is, a regular key, or according to the trunk open command transmitted from the transmitter 3, the antitheft ECU 7 shifts the status from the arming state to a temporal disarmed state. In such a case, the arming state is set again after an elapse of a predetermined length of time following closure of the trunk.

When a theft is detected based on information given by the sensor portion 5 in the arming state, the antitheft ECU 7 gives a command to the alarm output portion 6 so as to output an alarm.

Next, the transmitter 3 will be described. The transmitter 3 is a device for allowing a remote operation of the vehicle-mounted apparatus 2. The transmitter 3 has a plurality of buttons 3a, and in the present embodiment, three buttons 3a are provided thereon. When a user presses the button 3a, a command containing an identification code is transmitted. The transmitter 3 is provided with, for example, a lock button L for locking a door, an unlock button U for unlocking a door, and a trunk open button Tr for unlocking a trunk. When the lock button L of the transmitter 3 is pressed so that the vehicle-mounted apparatus 2 locks the doors, the arming state is set. In other words, the lock button L has also a function to order a start of the arming state. Further, when the unlock button U of the transmitter 3 is pressed so that the vehicle-mounted apparatus 2 unlocks the doors, the disarmed state is set. In other words, the unlock button U has a function to order a start of the disarmed state.

Figure 2A:
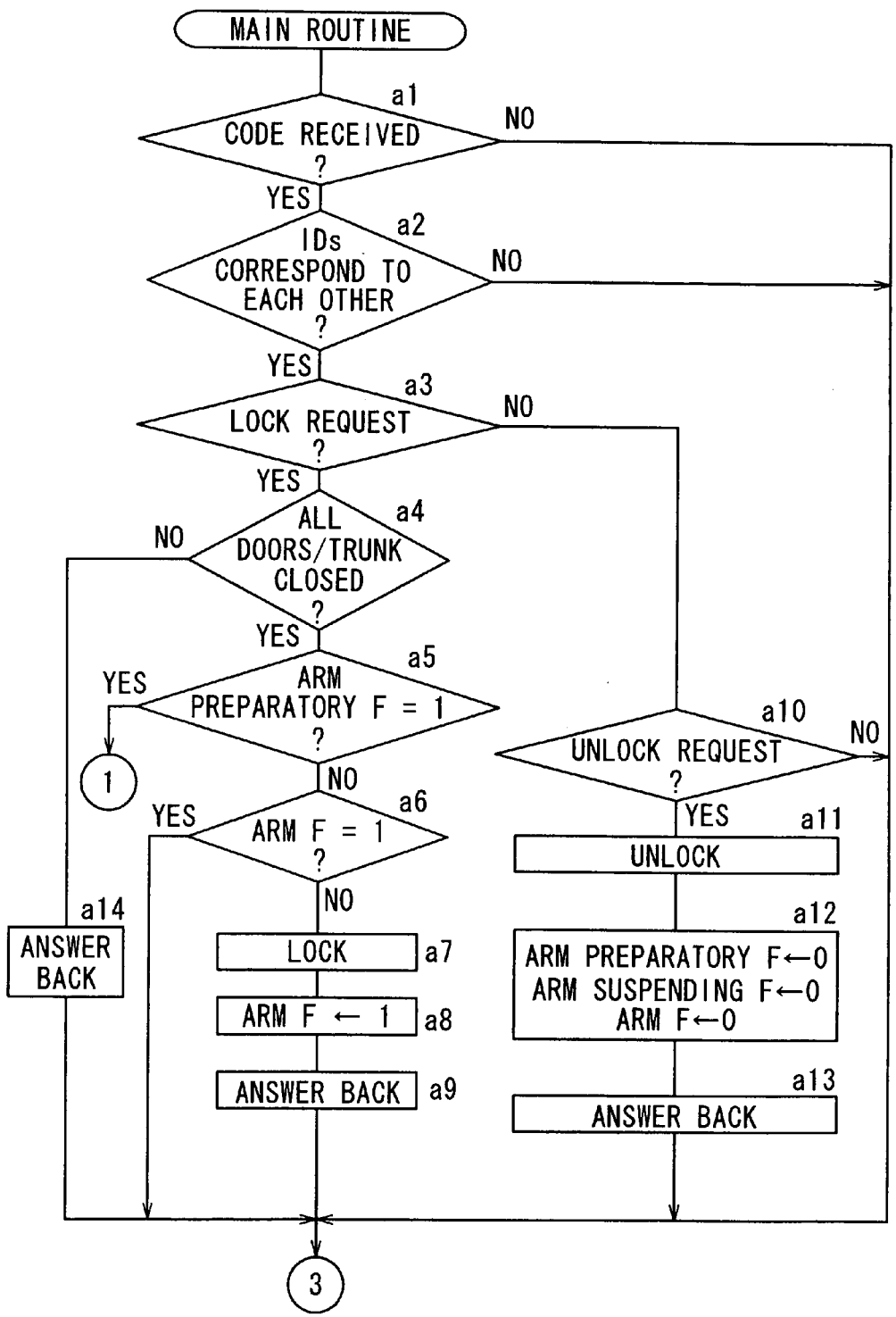
Figure 2C:
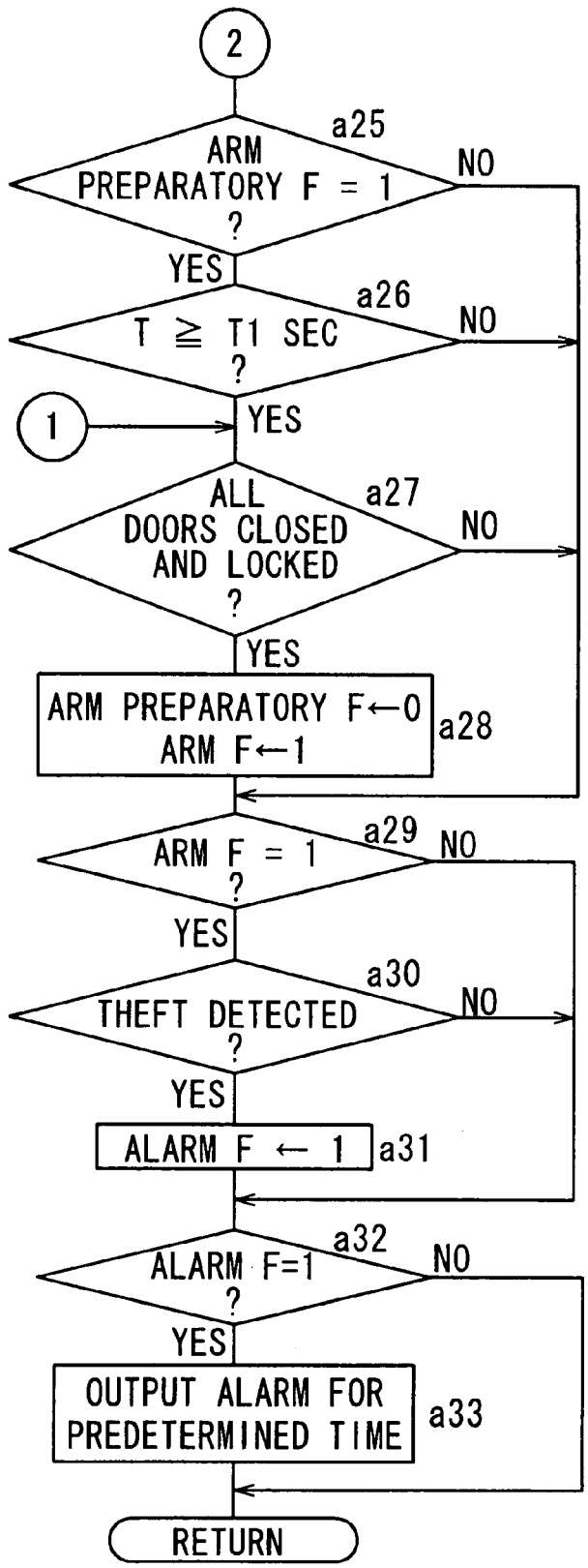
Figure 3:
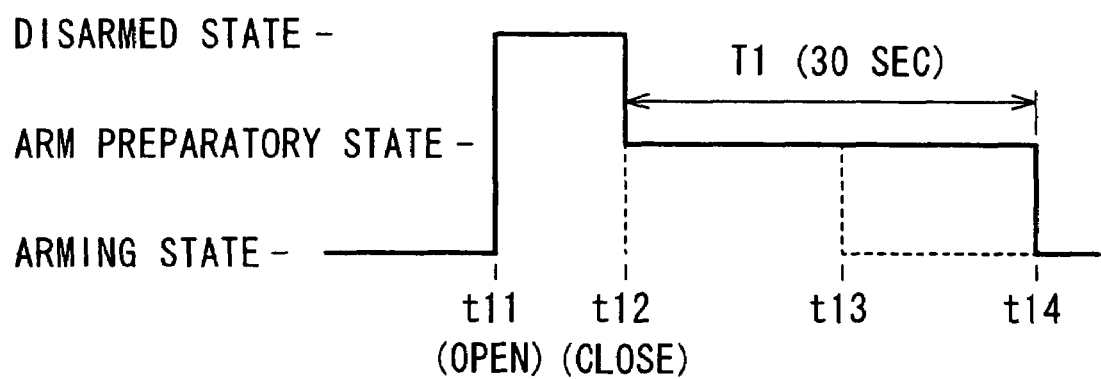
FIG. 3 is a timing chart for explaining operations of the antitheft ECU.

Next, operations of the antitheft apparatus 1 will be described with reference to a flowchart. Operations shown in all flowcharts are conducted by the antitheft ECU 7 of the vehicle-mounted apparatus 2. FIGS. 2A through 2C are flowcharts showing a process conducted by the antitheft ECU 7 of the vehicle-mounted apparatus 2. This process is repeatedly carried out in the case where the ignition is OFF and no key is inserted. FIG. 3 is a timing chart for explaining operations of the antitheft ECU 7. The timing chart shown in FIG. 3 is associated with the operations of the antitheft ECU 7 shown in FIGS. 2A through 2C.

At Step a1, the antitheft ECU 7 determines whether or not a command containing an identification code has been received from the transmitter 3. When it is determined that the command has been received, the process proceeds to Step a2, and when it is determined that the command has not been received, the process proceeds to Step a15. At Step a2, the antitheft ECU 7 determines whether or not the identification code and the identification code of the vehicle-mounted apparatus 2 correspond to each other. When it is determined that these identification codes correspond to each other, the process proceeds to Step a3, and when it is determined that these identification codes do not correspond to each other, the process proceeds to Step a15.

At Step a3, the antitheft ECU 7 determines whether or not the received command is a request for locking the doors. When it is determined that the received command is the lock request, the process proceeds to Step a4, and when it is determined that the received command is not the lock request, the process proceeds to Step a10. At Step a4, on the basis of the lock request, the antitheft ECU 7 determines whether or not the trunk and doors are in the closed state. When it is determined that the trunk and doors are in the closed state, the process proceeds to Step a5, and when it is determined that the trunk and door are in the open state, the process proceeds to Step a14. At Step a5, the antitheft ECU 7 determines whether or not an arm preparatory flag indicates 1, that is, whether or not an arm preparatory state has been set. When it is determined that the arm preparatory flag does not indicate 1, that is, when it is determined that the arm preparatory state has not been set, the process proceeds to Step a6, and when it is determined that the arm preparatory flag indicates 1, that is, when it is determined that the arm preparatory state has been set, the process proceeds to Step a27. Note that the arm preparatory flag indicates a value to represent whether or not the arm preparatory state has been set, and indicates either 0 or 1. When the arm preparatory state has been set, the arm preparatory flag indicates 1, and when the arm preparatory state has not been set, the arm preparatory flag indicates 0.

At Step a6, the antitheft ECU 7 determines whether or not an arm flag indicates 1, that is, whether or not an arming state has been set. When it is determined that the arm flag does not indicate 1, that is, when it is determined that the arming state has not been set, the process proceeds to Step a7, and when it is determined that the arm flag indicates 1, that is, when it is determined that the arming state has been set, the process proceeds to Step a15. Note that the arm flag indicates a value to represent whether or not the arming state has been set, and indicates either 0 or 1. When the arming state has been set, the arm flag indicates 1, and when the arming state has not been set, the arm flag indicates 0.

At Step a7, the antitheft ECU 7 locks the doors based on the lock request transmitted from the transmitter 3. The process then proceeds to Step a8. At Step a8, the antitheft ECU 7 makes the arm flag indicate 1 so that the arming state is set. The process then proceeds to Step a9. At Step a9, the antitheft ECU 7 gives answer back in response to the lock request. The answer back is a process of, for example, outputting sound through a horn and lighting up the hazard lamp 16.

At Step a14, the antitheft ECU 7 gives answer back to indicate that the doors cannot be locked because the door has been determined as being open at Step a4. The process then proceeds to Step a15. At Step a10, the antitheft ECU 7 determines whether or not the command is the unlock request because the command has been determined as being not the lock request at Step a3. When it is determined that the command is the unlock request, the process proceeds to Step a11, and when it is determined that the command is not the unlock request, the process proceeds to Step a15. At Step a11, on the basis of the unlock request transmitted from the transmitter 3, the antitheft ECU 7 unlocks the doors. The process then proceeds to Step a12. At Step a12, the doors have been unlocked and therefore, the antitheft ECU 7 makes the arm preparatory flag, an arm suspending flag, and the arm flag indicate all 0, that is, the antitheft ECU 7 sets the disarmed state which is not any of those states of the arm preparatory state, an arm suspending state, and the arming state. The process then proceeds to Step a13. Note that the arm suspending flag indicates a value to represent whether or not the arm suspending state has been set, and indicates either 0 or 1. When the arm suspending state has been set, the arm suspending flag indicates 1, and when the arm suspending state has not been set, the arm suspending flag indicates 0. At Step a13, the antitheft ECU 7 gives answer back in response to the unlock request. The process then proceeds to Step a15.

At Step a15, the antitheft ECU 7 determines whether or not the status of trunk has been shifted from the closed state to the open state by a user. When it is determined that the status of trunk has been shifted to the open state, the process proceeds to Step a16, and when it is determined that the status of trunk has not been shifted to the open state, the process proceeds to Step a19. Note that the determination at Step a15 is made in such a manner that the status of trunk is determined as being shifted to the open state when the trunk open command given by way of the trunk open button Tr of the transmitter 3 is detected or when opening of the trunk effected by using the trunk key is detected by the trunk key switch 13. At Step a16, the antitheft ECU 7 determines whether or not the arm flag indicates 1, that is, whether or not the arming state has been set. When it is determined that the arm flag does not indicate 1, that is, when it is determined that the arming state has not been set, the process proceeds to Step a19, and when it is determined that the arm flag indicates 1, that is, when it is determined that the trunk is opened by regular means in the arming state, the antitheft ECU 7 makes the arm flag indicate 0 at Step a17 so that the disarmed state is set. Next, at Step a18, the antitheft ECU 7 makes the arm suspending flag indicate 1 in order to show that the arming state is temporarily interrupted by opening of the trunk through the regular means. The process then proceeds to Step a19.

At Step a19, the antitheft ECU 7 determines whether or not the status of trunk has been shifted from the open state to the closed state by a user. When it is determined that the status of trunk has been shifted to the closed state, the process proceeds to Step a20, and when it is determined that the status of trunk has not been shifted to the closed state, the process proceeds to Step a25. At Step a20, the antitheft ECU 7 determines whether or not the arm suspending flag indicates 1. When it is determined that the arm suspending flag indicates 1, that is, when it is determined that the trunk has been opened by the regular means in the arming state and then its status has been shifted to the closed state, the process proceeds to Step a21. When it is determined that the arm suspending flag does not indicate 1, that is, when it is determined that the arm suspending state has not been set, the process proceeds to Step a25. At Step a21, the antitheft ECU 7 makes the arm suspending flag indicate 0. The process then proceeds to Step a22. At Step a22, the antitheft ECU 7 makes the arm preparatory flag indicate 1 in order to show that there has been set a temporal disarmed state involving opening and closing of the trunk in the arming state. The process then proceeds to Step a23. At Step a23, the antitheft ECU 7 starts a timer. The process then proceeds to Step a24. At Step a24, the antitheft ECU 7 gives answer back for informing a start of the temporal disarmed state lasting for a predetermined length of time. The process then proceeds to Step a25.

At Step a25, the antitheft ECU 7 determines whether or not the arm preparatory flag indicates 1. When it is determined that the arm preparatory flag indicates 1, that is, when it is determined that the temporal disarmed state has been set, the process proceeds to Step a26, and when it is determined that the arm preparatory flag does not indicate 1, the process proceeds to Step a29. At Step a26, the antitheft ECU 7 determines whether or not a length of time T counted by the timer has reached a predetermined length of preparatory period T1, for example, 30 seconds. When it is determined that the time T has reached the predetermined length of preparatory period T1, the process proceeds to Step a27, and when it is determined that the time T has not reached the predetermined length of preparatory period T1, the process proceeds to Step a29. Note that the length of preparatory period T1 is set in consideration of a length of time required for the vehicle vibration to be suppressed, which vehicle vibration is generated by, for example, opening of the trunk, thereafter taking a baggage in and out of the trunk room, and closing of the trunk.

At Step a27, the antitheft ECU 7 determines whether or not the trunk and doors are locked in the closed state, in order to set the arming state once again after completion of the temporal disarmed state. When it is determined that the trunk and doors are locked, the process proceeds to Step a28, and when it is determined that the trunk and door are not locked, the process proceeds to Step a29. At Step a28, the antitheft ECU 7 makes the arm preparatory flag indicate 0 and the arm flag indicate 1. The process then proceeds to Step a29. This causes the arming state to be set again. At Step a29, the antitheft ECU 7 determines whether or not the arm flag indicates 1. When it is determined that the arm flag indicates 1, the process proceeds to Step a30, and when it is determined that the arm flag does not indicate 1, the process proceeds to Step a32.

At Step a30, on the basis of the information given by the sensor portion 5, the antitheft ECU 7 determines whether or not a theft has been detected. When it is determined that the theft has been detected, the process proceeds to Step a31, and when it is determined that no theft has been detected, the process proceeds to Step a32. At Step a31, the theft has been detected and therefore, the antitheft ECU 7 makes an alarm flag indicate 1 so that a theft outbreak state is set. The process then proceeds to Step a32. Note that the alarm flag indicates a value to represent whether or not there has been set the theft outbreak state showing that the theft has occurred, and indicates either 0 or 1. When the theft outbreak state has been set, the alarm flag indicates 1, and when the theft outbreak state has not been set, the alarm flag indicates 0.

At Step a32, the antitheft ECU 7 determines whether or not the alarm flag indicates 1. When it is determined that the alarm flag indicates 1, that is, when it is determined that the theft outbreak state has been set, the process proceeds to Step a33, and when it is determined that the alarm flag does not indicate 1, that is, when it is determined that the theft outbreak state has not been set, the process returns to Step a1. At Step a33, the theft outbreak state has been set and therefore, the antitheft ECU 7 makes the alarm output portion 6 output an alarm over a predetermined alarm period. The process then returns to Step a1.

With reference to FIG. 3, operations will be described. Opening the trunk in the arming state at a time point t11 by means of the transmitter 3 lifts the arming state to set the arm suspending state as shown from Step a15 to Step a18. By setting the arm suspending state, there is brought a temporary disarmed state which is obtained by temporal interruption of the arming state attributable to opening of the trunk by regular means, resulting in a security-monitoring lifted state.

Subsequently, closing the trunk at a time point t12 sets the arm preparatory state indicating the temporary disarmed state involving opening and closing of the trunk in the arming state as shown from Step a19 to Step a24. At the time point t12, a timer is activated. And then, at a time point t14 after an elapse of length of preparatory period T1, for example, 30 seconds, counted by the timer, the arming state is automatically set as shown from Step a25 to Step a28, resulting in a security-monitoring state.

When a lock request is received again at a time point t13 included in a period where the arm preparatory flag indicates 1, in other words, where the arm preparatory state is maintained within the length of preparatory period T1 after closure of the trunk following a shift in the status of trunk in the arming state from the closed state to the open state, the process proceeds from Step a5 to Step a27. At this point, the arming state is immediately set as indicated with a broken line in FIG. 3, resulting in a security-monitoring state.

As described above, in the antitheft apparatus 1 according to the embodiment, the antitheft ECU 7 conducts control of setting the disarmed state when the status change from the closed state to the open state of the trunk caused by the regular means is detected in the arming state. Accordingly, a user is enabled to have the trunk opened without operations for the status change from the arming state to the disarmed state.

When the status change from the open state to the closed state of the trunk in such a disarmed state is detected, the arming state is set after an elapse of the length of preparatory period T1, and when the lock command is given within the length of preparatory period, the antitheft ECU 7 conducts control of setting the arming state. Accordingly, when no lock command is given within the length of preparatory period T1 following the closure of the trunk, the elapse of the length of preparatory period T1 results in a so-called automatic shifting from the disarmed state to the arming state. For example, even in a case where the antitheft apparatus 1 is provided with a sensor of which output is influenced by vibration of the vehicle, the vibration of the vehicle will have stopped after the elapse of the length of preparatory period T1, so that an undesired output of alarm can be prevented even when the arming state is set. The user can thus set the arming state only by closing the trunk but without any particular operations.

Further, the arming state can be set when the lock command is given by the user within the length of preparatory period T1, with the result that even within the length of preparatory period T1, the arming state can be set at a user's desired moment. In the embodiment, the antitheft apparatus 1 does not include a sensor such as the intrusion sensor 8 and the tilt sensor 9, of which output is influenced by the vibration of the vehicle, and the length of preparatory period T1 is thus not necessary. Anyway, the arming state can be set within the length of preparatory period T1 so that the security within the length of preparatory period T1 can be ensured. Consequently, the security can be ensured by one antitheft apparatus 1 regardless of presence or absence of the sensor of which output is influenced by vibration of the vehicle. The antitheft apparatus 1 can be thus enhanced in versatility and reduced in production cost.

Next, an antitheft apparatus 1a according to a second embodiment of the invention will be described. In the vehicle-mounted apparatus 2 provided in the antitheft apparatus 1a according to the present embodiment, the sensor portion 5 includes the vibration detecting section 17 of which output is influenced by the vibration of the vehicle. The vibration detecting section 17 comprises the intrusion sensor 8 and the tilt sensor 9. The intrusion sensor 8 uses ultrasound, for example, to detect information based on reflection of the ultrasound within vehicle space, and gives the detected information to the antitheft ECU 7. The antitheft ECU 7 determines presence or absence of an intruder into the vehicle based on the information given by the intrusion sensor 8. When determining the presence of the intruder, the antitheft ECU 7 controls the alarm output portion 6 so as to output an alarm.

The tilt sensor 9 detects inclination of the vehicle, and gives the detected information to the antitheft ECU 7. The antitheft ECU 7 sets a default tilt angle based on the output of the tilt sensor 9 in the arming state. When the default tilt angle of the vehicle is increased by a predetermined angle, on the basis of the information given by the tilt sensor 9, the antitheft ECU 7 determines that the vehicle has been undesirably inclined, and then controls the alarm output portion 6 so as to output an alarm.

Figure 4A:
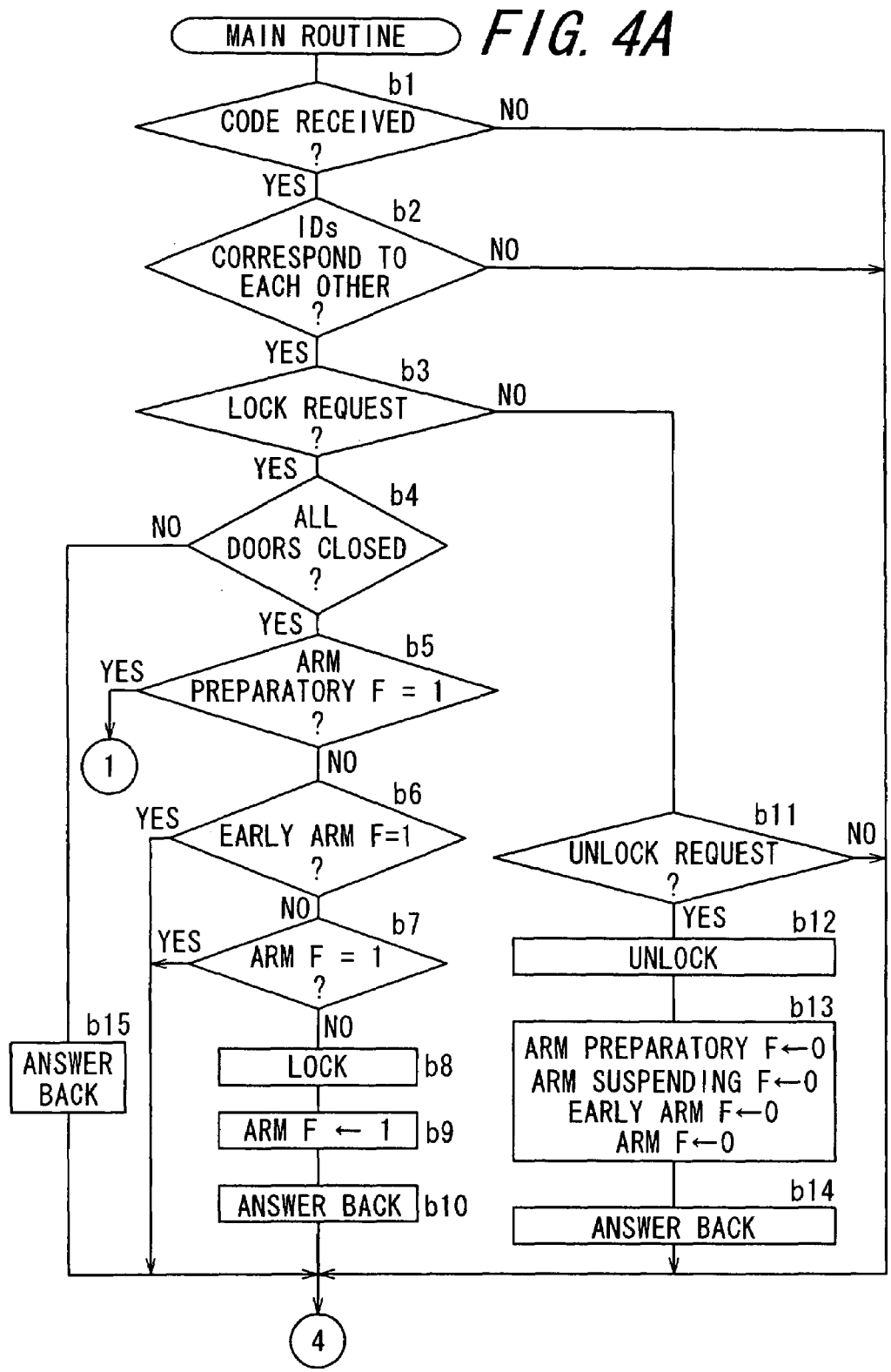
Figure 4B:
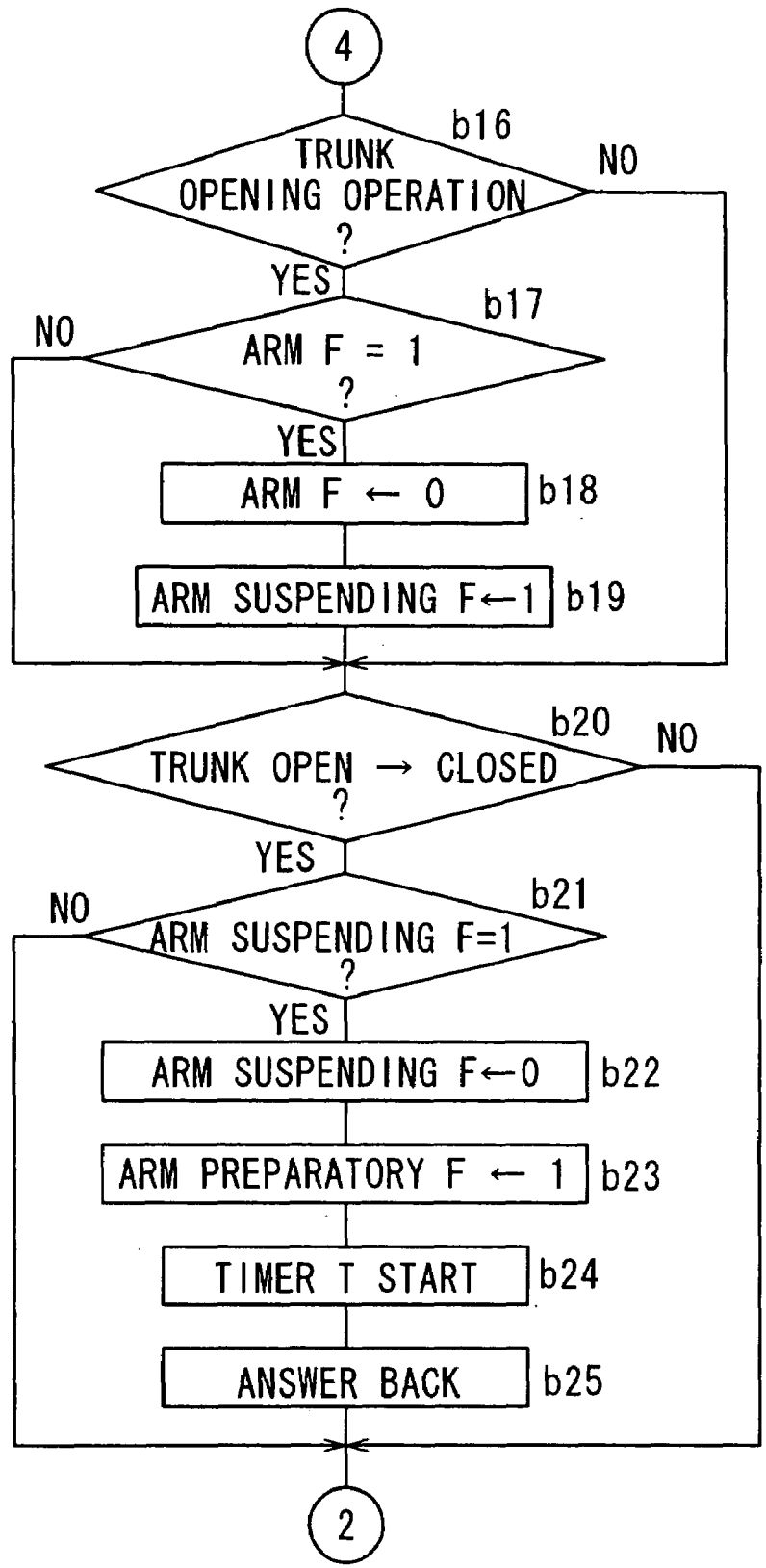
Figure 5:
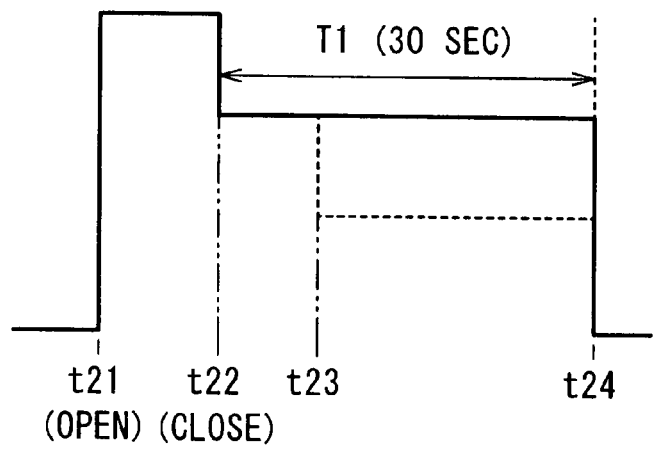
FIG. 5 is a timing chart for explaining operations of the antitheft ECU.

FIGS. 4A through 4C are flowcharts showing a process conducted by the antitheft ECU 7 of the vehicle-mounted apparatus 2 provided in the antitheft apparatus 1a according to the embodiment. The process is repeatedly carried out in the case where the ignition is OFF and no key is inserted. FIGS. 4A and 4B show Steps b1 to b25, and FIG. 4C shows Steps b26 to b41. FIG. 5 is a timing chart for explaining the operations of the antitheft ECU 7. The timing chart shown in FIG. 5 is associated with the operations of the antitheft ECU 7 shown in FIGS. 4A through 4C.

At Step b1, the antitheft ECU 7 determines whether or not a command containing an identification code has been received from the transmitter 3. When it is determined that the command has been received, the process proceeds to Step b2, and when it is determined that the command has not been received, the process proceeds to Step b16. At Step b2, the antitheft ECU 7 determines whether or not the identification code and the identification code of the vehicle-mounted apparatus 2 correspond to each other. When it is determined that these identification codes correspond to each other, the process proceeds to Step b3, and when it is determined that these identification codes do not correspond to each other, the process proceeds to Step b16.

At Step b3, the antitheft ECU 7 determines whether or not the received command is a request for locking the doors. When it is determined that the received command is the lock request, the process proceeds to Step b4, and when it is determined that the received command is not the lock request, the process proceeds to Step b11. At Step b4, on the basis of the lock request, the antitheft ECU 7 determines whether or not the trunk and doors are in the closed state. When it is determined that the trunk and doors are in the closed state, the process proceeds to Step b5, and when it is determined that the trunk and door are in the open state, the process proceeds to Step b15. At Step b5, the antitheft ECU 7 determines whether or not the arm preparatory flag indicates 1. When it is determined that the arm preparatory flag does not indicate 1, that is, when it is determined that the arm preparatory state has not been set, the process proceeds to Step b6, and when it is determined that the arm preparatory flag indicates 1, that is, when it is determined that the arm preparatory state has been set, the process proceeds to Step b26.

At Step b6, the antitheft ECU 7 determines whether or not an early arm flag indicates 1. When it is determined that the early arm flag does not indicate 1, that is, when it is determined that an early arming state has not been set, the process proceeds to Step b7, and when it is determined that the early arm flag indicates 1, that is, when it is determined that the early arming state has been set, the process proceeds to Step b16. Note that the early arm flag indicates a value to represent that the arming state has been set earlier than it should be when receiving an arming request in the arm preparatory state generated by opening and closing of the trunk in the arming state, and the early arm flag indicates either 0 or 1. When the early arming state has been set, the early arm flag indicates 1, and when the early arming state has not been set, the early arm flag indicates 0.

At Step b7, the antitheft ECU 7 determines whether or not the arm flag indicates 1. When it is determined that the arm flag does not indicate 1, the process proceeds to Step b8, and when it is determined that the arm flag indicates 1, the process proceeds to Step b16. At Step b8, the antitheft ECU 7 locks the trunk or the door based on the lock request. The process then proceeds to Step b9. At Step b9, the antitheft ECU 7 makes the arm flag indicate 1 so that the arming state is set. The process then proceeds to Step b10. At Step b10, the antitheft ECU 7 gives answer back in response to the lock request. The process then proceeds to Step b16.

At Step b15, the antitheft ECU 7 gives answer back to indicate that the doors cannot be locked because the door has been determined as being open at Step b4. The process then proceeds to Step b16. At Step b11, the antitheft ECU 7 determines whether or not the command is the unlock request because the command has been determined as being not the lock request at Step b3. When it is determined that the command is the unlock request, the process proceeds to Step b12, and when it is determined that the command is not the unlock request, the process proceeds to Step b16. At Step b12, on the basis of the unlock request transmitted from the transmitter 3, the antitheft ECU 7 unlocks the trunk or the door. The process then proceeds to Step b13. At Step b13, the antitheft ECU 7 makes the arm preparatory flag, the arm suspending flag, the early arm flag, and the arm flag indicate all 0, that is, the antitheft ECU 7 sets the disarmed state. The process then proceeds to Step b14. At Step b14, the antitheft ECU 7 gives answer back in response to the unlock request. The process then proceeds to Step b16.

At Step b16, the antitheft ECU 7 determines whether or not the status of trunk has been shifted from the closed state to the open state by a user. When it is determined that the status of trunk has been shifted to the open state, the process proceeds to Step b17, and when it is determined that the status of trunk has not been shifted to the open state, the process proceeds to Step b20. At Step b17, the antitheft ECU 7 determines whether or not the arm flag indicates 1, that is, whether or not the arming state has been set. When it is determined that the arm flag indicates 1, the process proceeds to Step b18, and when it is determined that the arm flag does not indicate 1, the process proceeds to Step b20. At Step b18, the antitheft ECU 7 makes the arm flag indicate 0, that is, the antitheft ECU 7 sets the disarmed state. The process then proceeds to Step b19. At Step b19, the antitheft ECU 7 makes the arm suspending flag indicate 1, that is, the antitheft ECU 7 sets the arm suspending state. The process then proceeds to Step b20.

At Step b20, the antitheft ECU 7 determines whether or not the status of trunk has been shifted from the open state to the closed state by a user. When it is determined that the status of trunk has been shifted to the closed state, the process proceeds to Step b21, and when it is determined that the status of trunk has not been shifted to the closed state, the process proceeds to Step b28. At Step b21, the antitheft ECU 7 determines whether or not the arm suspending flag indicates 1. When it is determined that the arm suspending flag indicates 1, that is, when it is determined that the trunk has been opened by the regular means in the arming state and then its status has been shifted to the closed state, the process proceeds to Step b22. When it is determined that the arm suspending flag does not indicate 1, the process proceeds to Step b28. At Step b22, the antitheft ECU 7 makes the arm suspending flag indicate 0. The process then proceeds to Step b23. At Step b23, the antitheft ECU 7 makes the arm preparatory flag indicate 1 in order to show that there has been set a temporal disarmed state involving opening and closing of the trunk in the arming state. The process then proceeds to Step b24. At Step b23, the antitheft ECU 7 starts a timer. The process then proceeds to Step b25. At Step b25, the antitheft ECU 7 gives answer back for informing a start of the temporal disarmed state lasting for a predetermined length of time. The process then proceeds to Step b28.

At Step b26, the antitheft ECU 7 makes the early arm flag indicate 1 so as to set the early arming state representing that the arming state has been set earlier than it should be. The process then proceeds to Step b27. At Step b27, the antitheft ECU 7 makes the arm preparatory flag indicate 0. The process then proceeds to Step b28. At Step b28, the antitheft ECU 7 determines whether or not the arm preparatory flag indicates 1. When it is determined that the arm preparatory flag indicates 1, the process proceeds to Step b29, and when it is determined that the arm preparatory flag does not indicate 1, the process proceeds to Step b33. At Step b29, the antitheft ECU 7 determines whether or not the length of time T counted by the timer has reached the predetermined length of preparatory period T1. When it is determined that the time T has reached the predetermined length of preparatory period T1, the process proceeds to Step b30, and when it is determined that the time T has not reached the predetermined length of preparatory period T1, the process proceeds to Step b34. At Step b33, the antitheft ECU 7 determines whether or not the early arm flag indicates 1. When it is determined that the early arm flag indicates 1, the process proceeds to Step b29, and when it is determined that the early arm flag does not indicate 1, the process proceeds to Step b34.

At Step b30, the antitheft ECU 7 determines whether or not the trunk and doors are locked in the closed state, in order to set the arming state once again after completion of the temporal early arming state. When it is determined that the trunk and doors are locked, the process proceeds to Step b31, and when it is determined that the trunk and door are not locked, the process proceeds to Step b34. At Step b31, the antitheft ECU 7 makes the arm preparatory flag indicate 0, the early arm flag indicate 0, and the arm flag indicate 1. The process then proceeds to Step b32. This causes the arming state to be set again. At Step b32, the antitheft ECU 7 clears the time T of the timer. The process then proceeds to Step b34.

At Step b34, the antitheft ECU 7 determines whether or not the arm flag indicates 1. When it is determined that the arm flag indicates 1, the process proceeds to Step b35, and when it is determined that the arm flag does not indicate 1, the process proceeds to Step b37. At Step b35, on the basis of the information given by the sensor portion 5, the antitheft ECU 7 determines whether or not the theft has been detected. When it is determined that the theft has been detected, the process proceeds to Step b36, and when it is determined that no theft has been detected, the process proceeds to Step b40. At Step b36, theft has been detected and therefore, the antitheft ECU 7 makes the alarm flag indicate 1. The process then proceeds to Step b40.

At Step b37, the antitheft ECU 7 determines whether or not the early arm flag indicates 1. When it is determined that the early arm flag indicates 1, the process proceeds to Step b38, and when it is determined that the early arm flag does not indicate 1, the process proceeds to Step b40. At Step b38, on the basis of the information given by the sensor portion 5, the antitheft ECU 7 determines whether or not the status of door has been shifted from the closed state to the open state. When it is determined that the status of door has been shifted to the open state, the process proceeds to Step b39, and when it is determined that the status of door has not been shifted to the open state, the process proceeds to Step b40. At Step b39, the status of door has been shifted to the open state by irregular means in the early arming state and therefore, the antitheft ECU 7 determines that the theft has been detected. The antitheft ECU 7 then makes the alarm flag indicate 1 so that the theft outbreak state is set. The process then proceeds to Step b40.

At Step b40, the antitheft ECU 7 determines whether or not the alarm flag indicates 1. When it is determined that the alarm flag indicates 1, that is, when it is determined that the theft outbreak state has been set, the process proceeds to Step b41, and when it is determined that the alarm flag does not indicate 1, that is, when it is determined that the theft outbreak state has not been set, the process returns to Step b1. At Step b41, the antitheft ECU 7 makes the alarm output portion 6 output an alarm over a predetermined alarm period. The process then returns to Step b1.

With reference to FIG. 5, operations will be described. Opening the trunk in the arming state at a time point t21 by means of the transmitter 3 lifts the arming state to set the arm suspending state as shown from Step b16 to Step b19. By setting the arm suspending state, there is brought the disarmed state which is obtained by temporal interruption of the arming state attributable to opening of the trunk by the regular means, resulting in the security-monitoring lifted state.

Subsequently, closing the trunk at a time point t22 sets the arm preparatory state indicating the temporary disarmed state involving opening and closing of the trunk in the arming state as shown from Step b20 to Step a25. At the time point t22, the timer is activated. And then, at a time point t24 after an elapse of the length of preparatory period T1, for example, 30 seconds, counted by the timer, the arming state is automatically set as shown from Step b28 to Step a32, resulting in the security-monitoring state.

When the lock request is received again at a time point t23 included in a period where the arm preparatory flag indicates 1, in other words, where the arm preparatory state is maintained within the length of preparatory period T1 after closure of the trunk following a shift in the status of trunk in the arming state from the closed state to the open state, the process proceeds from Step b5 to Step b26. At this point, the early arming state is set as indicated with a broken line in FIG. 5 until the end of the length of preparatory period T1. While the early arming state is maintained, the values detected by the intrusion sensor 8 and the tilt sensor 9 are invalidated, and the door courtesy switch 10 and the trunk courtesy switch 11 are used to set the security-monitoring state, as shown from Step b37 to b39. When the length of preparatory period T1 has passed, the early arming state is automatically shifted to the arming state where the security-monitoring state is set by use of the entire sensor portion 5.

As described above, in the antitheft apparatus 1a according to the embodiment, the antitheft ECU 7 is designed to conduct control of invalidating the value detected by the vibration detecting section 17 until the end of the length of preparatory period T1 in the case where the arming state is set within the length of preparatory period T1 based on the lock command. In the case where the vibration detecting section 17 is provided in an antitheft apparatus, setting the arming state based on the lock command may cause output of an undesired alarm because the vehicle vibration may be not completely stopped within the length of preparatory period T1. However, a configuration designed to invalidate the value detected by the vibration detecting section 17 until the end of the length of preparatory period T1 makes it possible to reliably prevent the undesired alarm caused by the vibration detecting section 17 from being outputted. It is thus possible to ensure the security after the elapse of the length of preparatory period T1 by means of the vibration detecting section 17.

Figure 6:
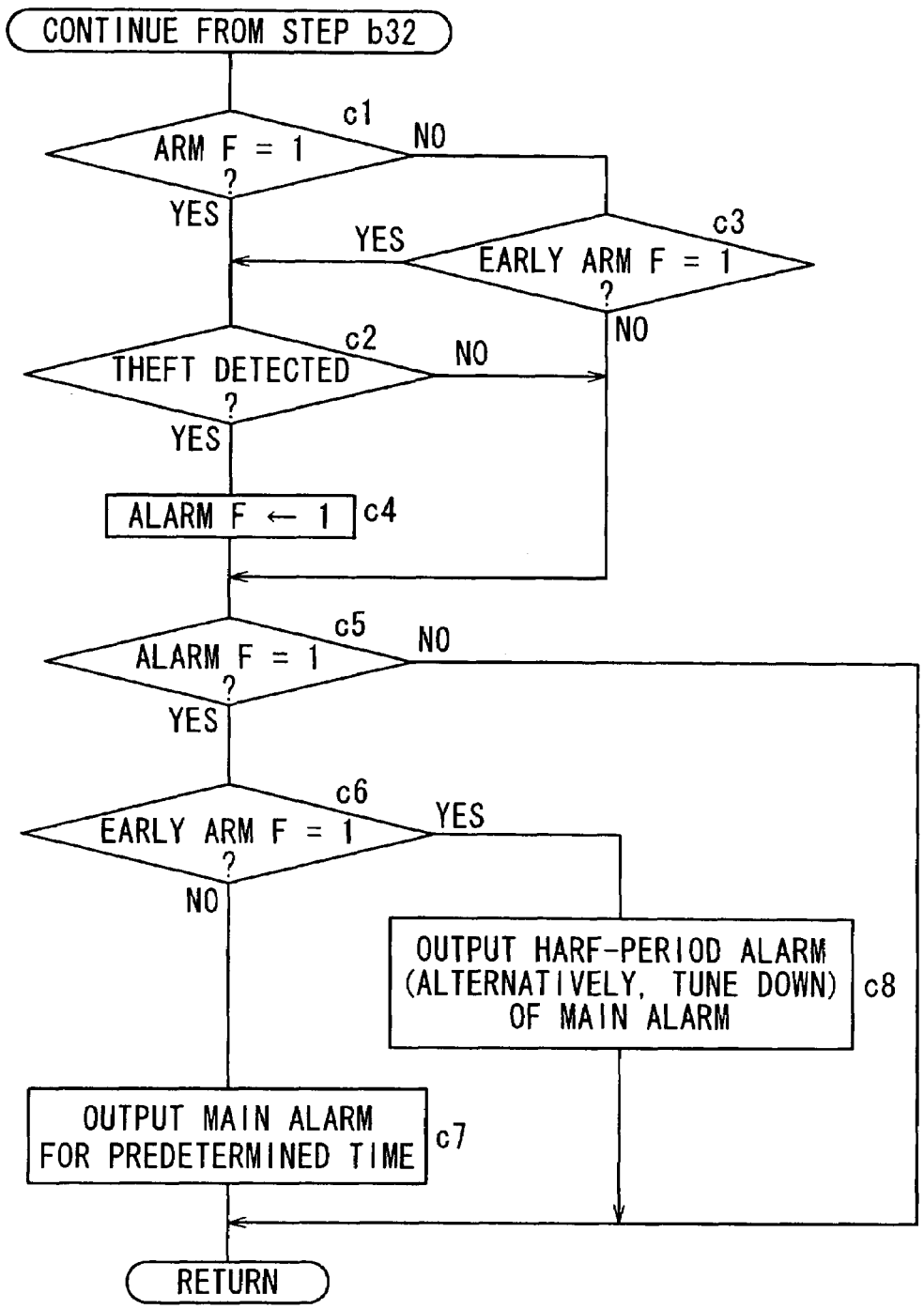
FIG. 6 is a flowchart showing a process conducted by an antitheft ECU of a vehicle-mounted apparatus provided in an antitheft apparatus according to a third embodiment of the invention.

Next, an antitheft apparatus 1b according to a third embodiment of the invention will be described. The vehicle-mounted apparatus 2 provided in the antitheft apparatus 1b according to the present embodiment is characteristic in an output state generated by the alarm output portion 6. FIG. 6 is a flowchart showing a process conducted by the antitheft ECU 7 of the vehicle-mounted apparatus 2 provided in the antitheft apparatus 1b according to the embodiment. Operations of the antitheft ECU 7 shown in FIG. 6 are carried out to replace the above-described operations from Step b34 to b41 explained in association with FIG. 4C.

Step c1 is a process following, for example, the above-described Step b32 shown in FIG. 4C, and is the same operation as that conducted at Step b34. That is to say, at Step c1, the antitheft ECU 7 determines whether or not the arm flag indicates 1. When it is determined that the arm flag indicates 1, that is, when it is determined that the arming state has been set, the process proceeds to Step c2, and when it is determined that the arm flag does not indicate 1, that is, when it is determined that the arming state has not been set, the process proceeds to Step c3. At Step c2, the arming state has been set and therefore, on the basis of the information given by the sensor portion 5, the antitheft ECU 7 determines whether or not the theft has been detected. When it is determined that the theft has been detected, the process proceeds to Step c4, and when it is determined that no theft has been detected, the process proceeds to Step c5. At Step c4, the theft has been detected and therefore, the antitheft ECU 7 makes the alarm flag indicate 1 so that the theft outbreak state is set. The process then proceeds to Step c5. At Step c3, the antitheft ECU 7 determines whether or not the early arm flag indicates 1. When it is determined that the early arm flag indicates 1, the process proceeds to Step c2, and when it is determined that the early arm flag does not indicate 1, the process proceeds to Step c5.

At Step c5, the antitheft ECU 7 determines whether or not the alarm flag indicates 1. When it is determined that the alarm flag indicates 1, that is, when it is determined that the theft outbreak state has been set, the process proceeds to Step c6, and when it is determined that the alarm flag does not indicate 1, that is, when it is determined that the theft outbreak state has not been set, the process returns to Step b1 shown in FIG. 4A. At Step c6, the antitheft ECU 7 determined whether or not the early arm flag indicates 1. When it is determined that the early arm flag indicates 1, the process proceeds to Step c8, and when it is determined that the early arm flag does not indicate 1, the process proceeds to Step c7. At Step c7, not the early arming state but the arming state has been set and therefore, the antitheft ECU 7 makes the alarm output portion 6 output an alarm over a predetermined first alarm period. The process then returns to Step b1 shown in FIG. 4A. At Step c8, the early arming state has been set and therefore, the antitheft ECU 7 makes the alarm output portion 6 output an alarm of which output state is different from that in the case of theft detection in the arming state. For example, the alarm output portion 6 outputs an alarm over a second alarm period which is shorter than the first alarm period. The length of the second alarm period is, for example, half the length of the first alarm period. The process then proceeds to Step b1 shown in FIG. 4A.

As described above, in the antitheft apparatus 1b according to the embodiment, the alarm output portion 6 is controlled so as to output different alarms from a period in the early arming state to a period in the arming state, that is, from a period within the length of preparatory period T1 to a period after the elapse of the length of preparatory period T1. In the embodiment, there is a difference in length of alarm-outputting period between a first alarm which is outputted upon the theft detection after the elapse of the length of preparatory period T1 and a second alarm which is outputted upon the theft detection within the length of preparatory period T1. However, the difference between the first and second alarms is not limited to the above example, and the difference may be made by tuning down a volume of one of the alarms or by forming different sound quality from the first alarm to the second alarm. Further, such a differentiation does not have to depend on the alarm, and alternatively, the hazard lamp 16 may be set to have different output states. This allows a user to tell the alarm within the length of preparatory period T1 from the alarm after the elapse of the length of preparatory period T1 on the basis of the output state of the alarm.

Next, an antitheft apparatus 1c according to a fourth embodiment of the invention will be described. The antitheft apparatus 1c according to the present embodiment is characteristic in that a length of the length of preparatory period T1 can be modified. In the antitheft apparatus 1c according to the embodiment which is particularly similar to the antitheft apparatus 1a according to the second embodiment, the sensor portion 5 contains the vibration detecting section 17 that detects a change of switching mode.

Figure 7:
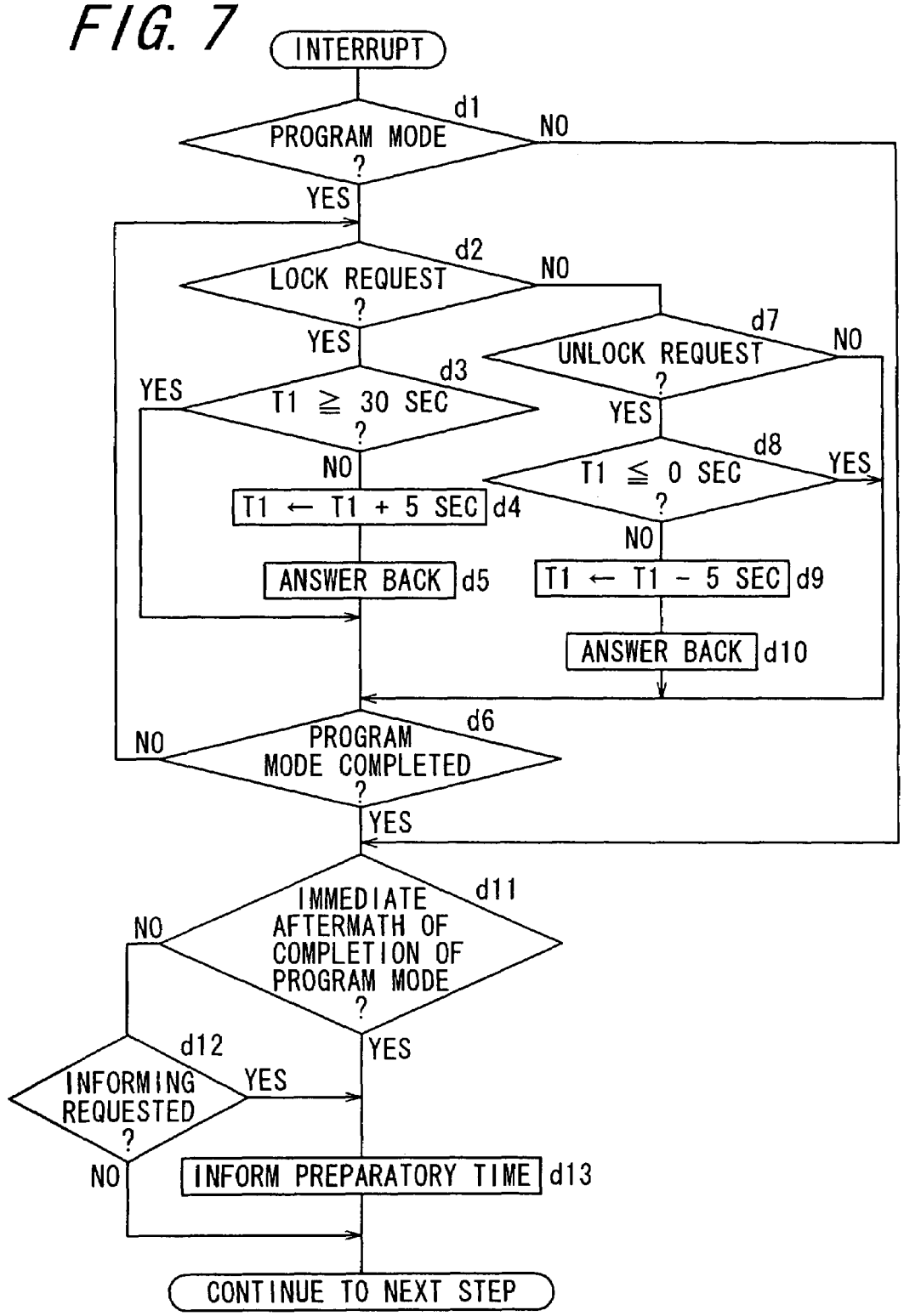
FIG. 7 is a flowchart showing a process conducted by an antitheft ECU of a vehicle-mounted apparatus provided in an antitheft apparatus according to a fourth embodiment of the invention.

FIG. 7 is a flowchart showing a process conducted by the antitheft ECU 7 of the vehicle-mounted apparatus provided in the antitheft apparatus 1c according to the embodiment. Operations of the antitheft ECU 7 shown in FIG. 7 are incorporated into a part of the above-described operations shown in FIGS. 2A through 2C or FIGS. 4A through 4C. In the embodiment, a length of the length of preparatory period T1 is 0 second or more and 30 seconds or less, and can be modified at every 5 seconds. In default configuration, a length of default period T2 is set at 20 seconds. Further, in the embodiment, an operation corresponding to the lock request is an operation to prolong the length of preparatory period T1 while an operation corresponding to the unlock request is an operation to shorten the length of preparatory period T1, in a program mode where the length of length of preparatory period T1 is changeable. The program mode starts by a user's particular operation. The particular operation includes, for example, turning the ignition ON and pressing the lock button and the unlock button of the transmitter 3 at the same time for five seconds or more.

At Step d1, after the particular operation as described above, the antitheft ECU 7 determines whether or not there has been set the program mode where the length of length of preparatory period T1 is changeable. When it is determined that the program mode has been set, the process proceeds to Step d2, and when it is determined that the program mode has not been set, the process proceeds to Step d11. At Step d2, the antitheft ECU 7 determines whether or not the received command is a request for locking the doors. When it is determined that the received command is the lock request, the process proceeds to Step d3, and when it is determined that the received command is not the lock request, the process proceeds to Step d7.

At Step d3, the antitheft ECU 7 determines whether or not the length of length of preparatory period T1 is 30 seconds or more which is a changeable maximum value. When it is determined that the length of length of preparatory period T1 is less than 30 seconds, the process proceeds to Step d4, and when it is determined that the length of preparatory period T1 is 30 seconds or more, the process proceeds to Step d6. At Step d4, the length of preparatory period T1 can be increased up to the maximum value and therefore, the antitheft ECU 7 makes the preparatory period T1 longer by five seconds. The process then proceeds to Step d5. At Step d5, the antitheft ECU 7 gives the answer back to inform that the length of preparatory period T1 has become 5-second longer. The process then proceeds to Step d6.

At Step d7, the antitheft ECU 7 determines whether or not the received command is a request for unlocking the door. When it is determined that the command is the unlock request, the process proceeds to Step d8, and when it is determined that the command is not the unlock request, the process proceeds to Step d6. At Step d8, the antitheft ECU 7 determines whether or not the length of preparatory period T1 is 0 seconds or less which is a changeable minimum value. When it is determined that the length of preparatory period T1 is more than 0 seconds, the process proceeds to Step d9, and when it is determined that the length of preparatory period T1 is 0 seconds or less, the process proceeds to Step d6. At Step d9, the length of preparatory period T1 can be decreased to the minimum value and therefore, the antitheft ECU 7 makes the length of preparatory period T1 shorter by five seconds. The process then proceeds to Step d10. At Step d10, the antitheft ECU 7 gives the answer back to inform that the length of preparatory period T1 has become 5-second shorter. The process then proceeds to Step d6.

At Step d6, the antitheft ECU 7 determines whether or not a particular operation is performed to complete the program mode. When it is determined that the program mode has been completed, the process proceeds to Step d11, and when it is determined that the program has not been completed, the process proceeds to Step d2. In this manner, the length of preparatory period T1 is repeatedly increased and decreased until the program mode is completed. At Step d11, the antitheft ECU 7 determines whether or not the present time is immediate after the completion of the program mode. When it is determined that the present time is immediate after the completion of the program mode, the process proceeds to Step d13, and when it is determined that the present time is not immediate after the completion of the program mode, the process proceeds to Step d12. At Step d12, the antitheft ECU 7 determines whether or not there is an informing request of the length of preparatory period T1. When it is determined that there is the informing request, the process proceeds to Step d13, and when it is determined that there is no informing request, the process proceeds to the next Step. At Step d13, when the present time is immediate after the completion of the program mode or when there is the informing request, the antitheft ECU 7 controls various parts to inform the set length of preparatory period T1. The process then proceeds to the next step.

As described above, it is possible to modify the length of preparatory period T1 by operating the lock button or unlock button of the transmitter 3 in the program mode.

Further, as stated at Step d13, the length of preparatory period T1 which has modified at the time of completion of the program mode, is outputted, for example, by making the short duration sounds a different number of times or in form of a synthesized voice. When the short duration sounds are made a different number of times to inform the length of preparatory period T1, for example, a prolonged sound represents 0 seconds; a one-time short duration sounds represents 5 seconds; and a two-time short duration sounds represents 10 seconds. The length of preparatory period T1 is thus informed so that the user can intuitively understand it with ease.

Further, as shown at Step d12, the length of preparatory period T1 may be informed also when the user requests to be informed of the length of preparatory period T1, for example, by conducting the particular operation for the informing request such as turning the ignition ON and operating the transmitter 3. The informing request may be given even when the arm preparatory flag indicates 1 in the arm preparatory state.

Figure 8:
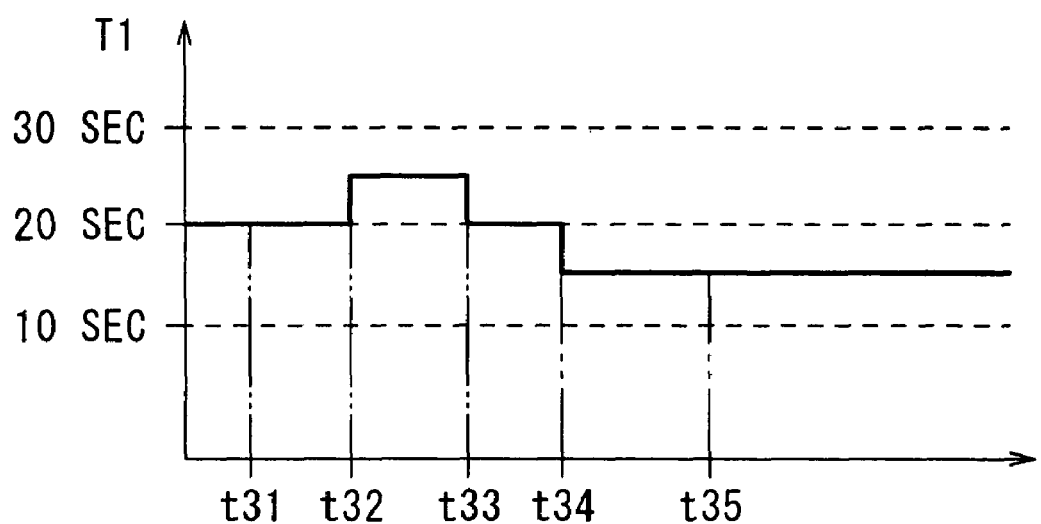
FIG. 8 is a timing chart for explaining operations when a length of preparatory period T1 is set.

FIG. 8 is a timing chart for explaining operations when the length of preparatory period T1 is set. As shown in FIG. 8, the program mode starts at a time point t31, and when the lock request is given at a time point t32, the length of preparatory period T1 is made longer by five seconds. Next, when the unlock request is given at a time point t33, the length of preparatory period T1 is made shorter by five seconds, and when the unlock request is given at a time point t34, the length of preparatory period T1 is made further shorter by five seconds. And then, at a time point t35, the program mode is brought to an end by a predetermined operation so that the setting of the length of preparatory period T1 is completed. Consequently, the length of preparatory period T1 is made to change from 20 seconds to 15 seconds.

Figure 9A:
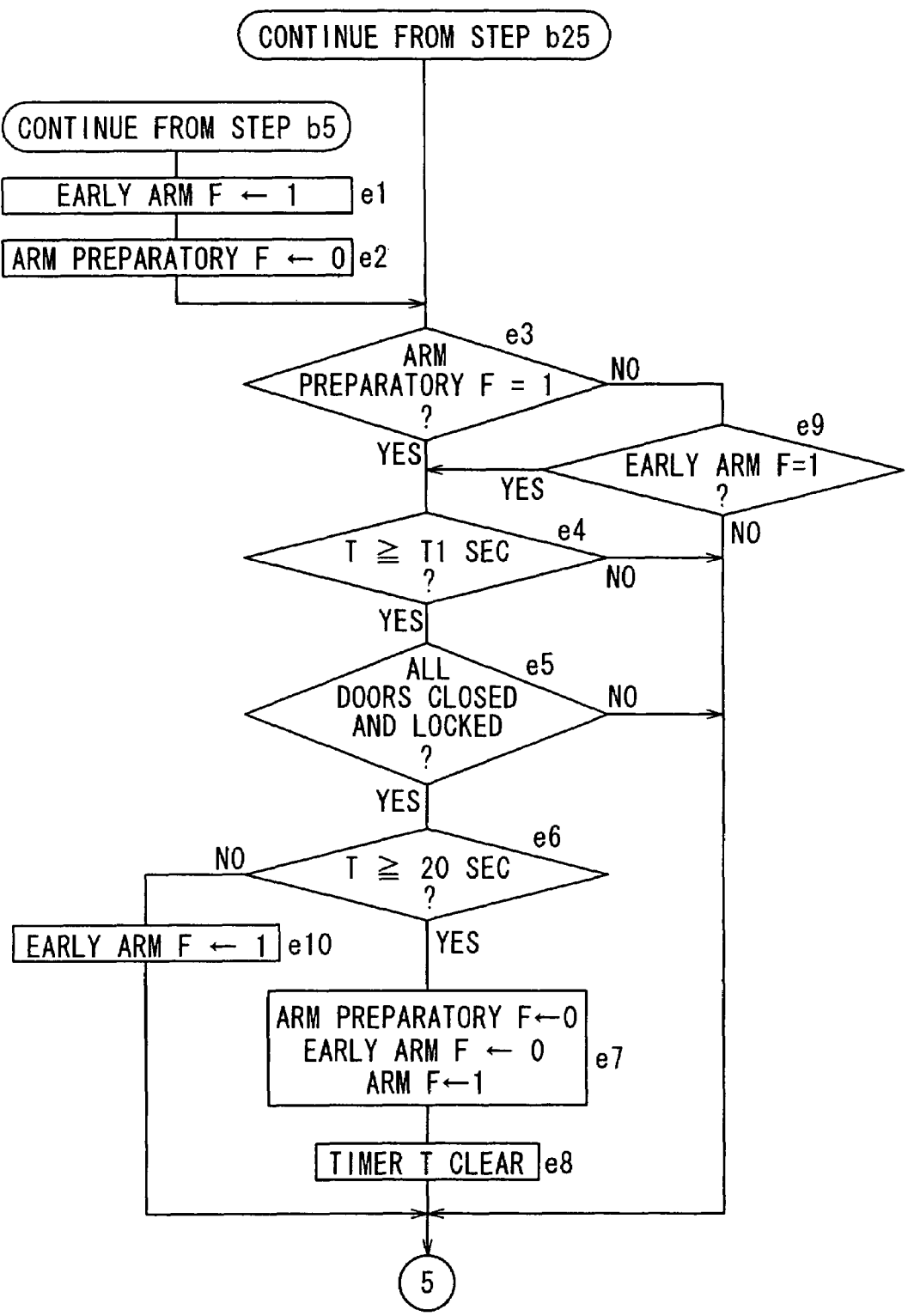
FIGS. 9A and 9B are flowcharts showing a process conducted by the antitheft ECU of the vehicle-mounted apparatus provided in the antitheft apparatus according to the fourth embodiment of the invention.
Figure 9B:
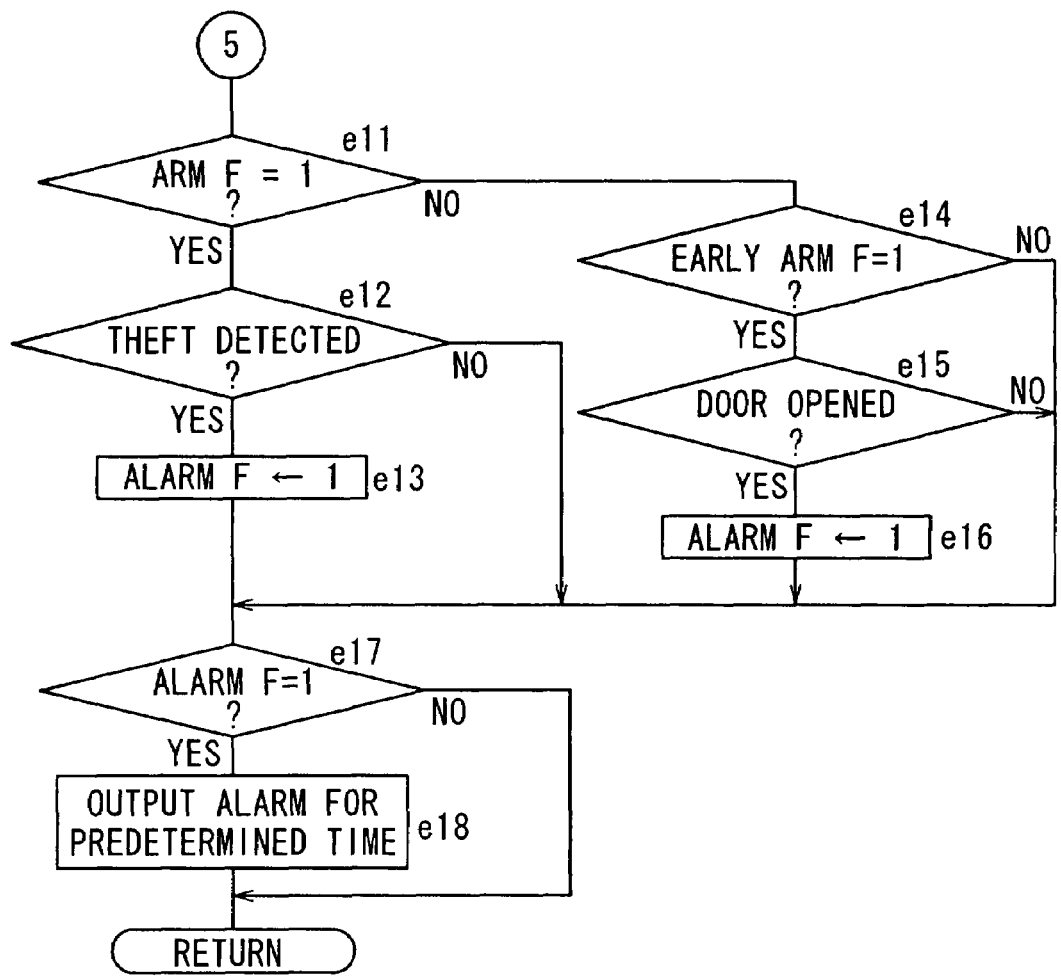

FIGS. 9A and 9B are flowcharts showing a process conducted by the antitheft ECU 7 of the vehicle-mounted apparatus 2 provided in the antitheft apparatus 1c according to the embodiment. The operations of the antitheft ECU 7 shown in FIGS. 9A and 9B are carried out to replace the above-described operations from Step b26 to b41 explained in association with FIG. 4C. FIG. 10 is a timing chart for explaining operations of the antitheft ECU 7, showing one example with a prolonged length of preparatory period T1. FIG. 11 is a timing chart for explaining operations of the antitheft ECU 7, showing one example with a shortened length of preparatory period T1. The timing charts shown in FIG. 10 and FIG. 11 are associated with the operations of the antitheft ECU 7 shown in FIGS. 9A and 9B.

Step e1 is a process following, for example, the above-described Step b5 shown in FIG. 4C, and is the same operation as that conducted at Step b26. That is to say, at Step e1, the antitheft ECU 7 makes the early arm flag indicate 1 so as to set the early arming state representing that the arming state has been set earlier than it should be. The process then proceeds to Step e2. At Step e2, the antitheft ECU 7 makes the arm preparatory flag indicate 0. The process then proceeds to Step e3. The process also proceeds from Step b25 to Step e3. At Step e3, the antitheft ECU 7 determines whether or not the arm preparatory flag indicates 1. When it is determined that the arm preparatory flag indicates 1, the process proceeds to Step e4, and when it is determined that the arm preparatory flag does not indicate 1, the process proceeds to Step e9. At Step e4, the antitheft ECU 7 determines whether or not the length of time T counted by the timer has reached the predetermined length of preparatory period T1. When it is determined that the time T has reached the predetermined length of preparatory period T1, the process proceeds to Step e5, and when it is determined that the time T has not reached the predetermined length of preparatory period T1, the process proceeds to Step e11. At Step e9, the antitheft ECU 7 determines whether or not the early arm flag indicates 1. When it is determined that the early arm flag indicates 1, the process proceeds to Step e4, and when it is determined that the early arm flag does not indicate 1, the process proceeds to Step e11.

At Step e5, the antitheft ECU 7 determines whether or not the trunk and doors are locked in the closed state, in order to set the arming state once again after completion of the temporal early arming state. When it is determined that the trunk and doors are locked, the process proceeds to Step e6, and when it is determined that the trunk and door are not locked, the process proceeds to Step e11. At Step e6, the antitheft ECU 7 determines whether or not the length of set length of preparatory period T1 is equal to or longer than a length of predetermined threshold period which is, for example, 20 seconds. When it is determined that the length of preparatory period T1 is 20 seconds or more, the process proceeds to Step e7, and when it is determined that the length of preparatory period T1 is less than 20 seconds, the process proceeds to Step e10. At Step e10, the length of preparatory period T1 is shorter than the default period T2 and therefore, the antitheft ECU 7 makes the early arm flag indicate 1, that is, the antitheft ECU 7 sets the early arming state, and the process then proceeds to Step e11.

At Step e7, the antitheft ECU 7 makes the arm preparatory flag indicate 0, the early arm flag indicate 0, and the arm flag indicate 1. The process then proceeds to Step e8. At Step e8, the antitheft ECU 7 clears the time T of the timer. The process then proceeds to Step e11.

At Step e11, the antitheft ECU 7 determines whether or not the arm flag indicates 1. When it is determined that the arm flag indicates 1, the process proceeds to Step e12, and when it is determined that the arm flag does not indicate 1, the process proceeds to Step e14. At Step e12, on the basis of the information given by the sensor portion 5, the antitheft ECU 7 determines whether or not the theft has been detected. When it is determined that the theft has been detected, the process proceeds to Step e13, and when it is determined that no theft has been detected, the process proceeds to Step e17. At Step e13, the antitheft ECU 7 makes the alarm flag indicate 1. The process then proceeds to Step e17.

At Step e14, the antitheft ECU 7 determines whether or not the early arm flag indicates 1. When it is determined that the early arm flag indicates 1, the process proceeds to Step e15, and when it is determined that the early arm flag does not indicate 1, the process proceeds to Step e17. At Step e15, on the basis of the information given by the sensor portion 5, the antitheft ECU 7 determines whether or not the status of door has been shifted from the closed state to the open state. When it is determined that the status of door has been shifted to the open state, the process proceeds to Step e16, and when it is determined that the status of door has not been shifted to the open state, the process proceeds to Step e17. At Step e16, the theft has been detected and therefore, the antitheft ECU 7 makes the alarm flag indicate 1 so that the theft outbreak state is set. The process then proceeds to Step e17.

At Step e17, the antitheft ECU 7 determines whether or not the alarm flag indicates 1. When it is determined that the alarm flag indicates 1, that is, when it is determined that the theft outbreak state has been set, the process proceeds to Step e18, and when it is determined that the alarm flag does not indicate 1, that is, when it is determined that the theft outbreak state has not been set, the process returns to Step b1 shown in FIG. 4A. At Step e18, the antitheft ECU 7 makes the alarm output portion 6 output an alarm over a predetermined alarm period. The process then returns to Step b1 shown in FIG. 4A.

With reference to FIG. 10, there will be described the operations performed in the case where the length of preparatory period T1 is set at 30 seconds which is 20-second longer than the length of default period T2. Opening the trunk in the arming state at a time point t41 by means of the transmitter 3 causes the temporal disarmed state to be set, resulting in the security-monitoring lifted state.

Subsequently, closing the trunk at a time point t42 activates the timer. And at a time point t44 after the elapse of the length of preparatory period T1, for example, 30 seconds, the arm flag is made to indicate 1 as shown at Step e7 so that the arming state is set, resulting in the security-monitoring state.

When a lock request is received again at a time point t43 included in a period where the arm preparatory flag indicates 1, in other words, where the arm preparatory state is maintained within the length of preparatory period T1 after closure of the trunk, the early arming state is set as indicated with a broken line until the end of the length of preparatory period T1. While the early arm flag is set, that is, during the early arming state, the values detected by the intrusion sensor 8 and the tilt sensor 9 are invalidated, and the door courtesy switch 10 and the trunk courtesy switch 11 are used to set the security-monitoring state, as shown from Step e14 to e16. At a time point t44 after the elapse of the length of preparatory period T1, the status is automatically shifted from the early arming state to the arming state where the security-monitoring state is set by use of the entire sensor portion 5.

With reference to FIG. 11, there will be described the operations performed in the case where the length of preparatory period T1 is set at 10 seconds which is 20-second shorter than the length of default period T2. Opening the trunk in the arming state at a time point t51 by means of the transmitter 3 causes the temporal disarmed state to be set, resulting in the security-monitoring lifted state.

Subsequently, closing the trunk at a time point t52 activates the timer. And at a time point t54 after the elapse of the length of preparatory period T1, for example, 10 seconds, the early arm flag is made to indicate 1 as shown at Step e6 and Step e10 so that the early arming state is set.

When a lock request is received again at a time point t53 included in a period where the arm preparatory flag indicates 1, in other words, where the arm preparatory state is maintained within the length of preparatory period T1 after closure of the trunk, the early arming state is set as indicated with a broken line until the end of the length of preparatory period T1. While the early arm flag is set, that is, during the early arming state, the values detected by the intrusion sensor 8 and the tilt sensor 9 are invalidated, and the door courtesy switch 10 and the trunk courtesy switch 11 are used to set the security-monitoring state. At a time point t55 after the elapse of the length of preparatory period T1, the status is shifted from the early arming state to the arming state where the security-monitoring state is set by use of the entire sensor portion 5.

As described above, in the antitheft apparatus 1c according to the embodiment, the length of preparatory period T1 can be modified, with the result that the length of preparatory period T1 can be set at a user's desired length. This makes it possible to set the length of preparatory period T1 to have such a length that the antitheft apparatus 1c can favorably operate, thus leading enhancement in versatility thereof.

Further, in the embodiment, when the length of preparatory period T1 is shorter than the length of default period T2, the antitheft ECU 7 is designed to conduct control of invalidating the value detected by the vibration detecting section 17 until the end of the default period T2 in the case where the arming state is set within the length of preparatory period T1 based on the lock command. In the case where the length of preparatory period T1 is set to have a shorter length than the length of default period T2, even setting the arming state after the elapse of the length of preparatory period T1 may cause output of an undesired alarm due to a sensor which is influenced by vehicle vibration because the vehicle vibration may be still not completely stopped. However, a configuration designed to invalidate the value detected by the vibration detecting section 17 until the end of the default period T2 makes it possible to reliably prevent the undesired alarm caused by the vibration detecting section 17 from being outputted within the length of preparatory period T1. It is thus possible to ensure the security after the elapse of the default period T2 by means of the vibration detecting section 17.

Further, the antitheft ECU 7 has a configuration similar to that of the above-described configuration according to the third embodiment. In the case where the length of preparatory period T1 is shorter than the predetermined length of default period T2, the antitheft ECU 7 may be designed to conduct control of outputting different alarms from a period within the length of preparatory period T1 to a period after the elapse of the length of preparatory period T1. This allows a user to tell the alarm within the length of preparatory period T1 from the alarm after the elapse of the length of preparatory period T1 on the basis of the output state of the alarm in the case where the length of preparatory period T1 has been set to be shorter than the length of default period T2.

Next, an antitheft apparatus 1d according to a fifth embodiment of the invention will be described. The antitheft apparatus 1d according to the present embodiment is characteristic in that the presence or absence of the vibration detecting section 17 is detected and based on the result regarding the presence or absence of the vibration detecting section 17, the length of preparatory period T1 is set to be either of a first length of preparatory period T11 or a second length of preparatory period T12. The antitheft ECU 7 has a function as a connection detecting section and thus detects, based on information given thereto, whether or not the tilt sensor 9 and intrusion sensor 8 serving as the vibration detecting section 17 are connected to the antitheft ECU 7. In other words, the antitheft ECU 7 can determine the presence or absence of the tilt sensor 9 and intrusion sensor 8 serving as the vibration detecting section 17.

Figure 12B:
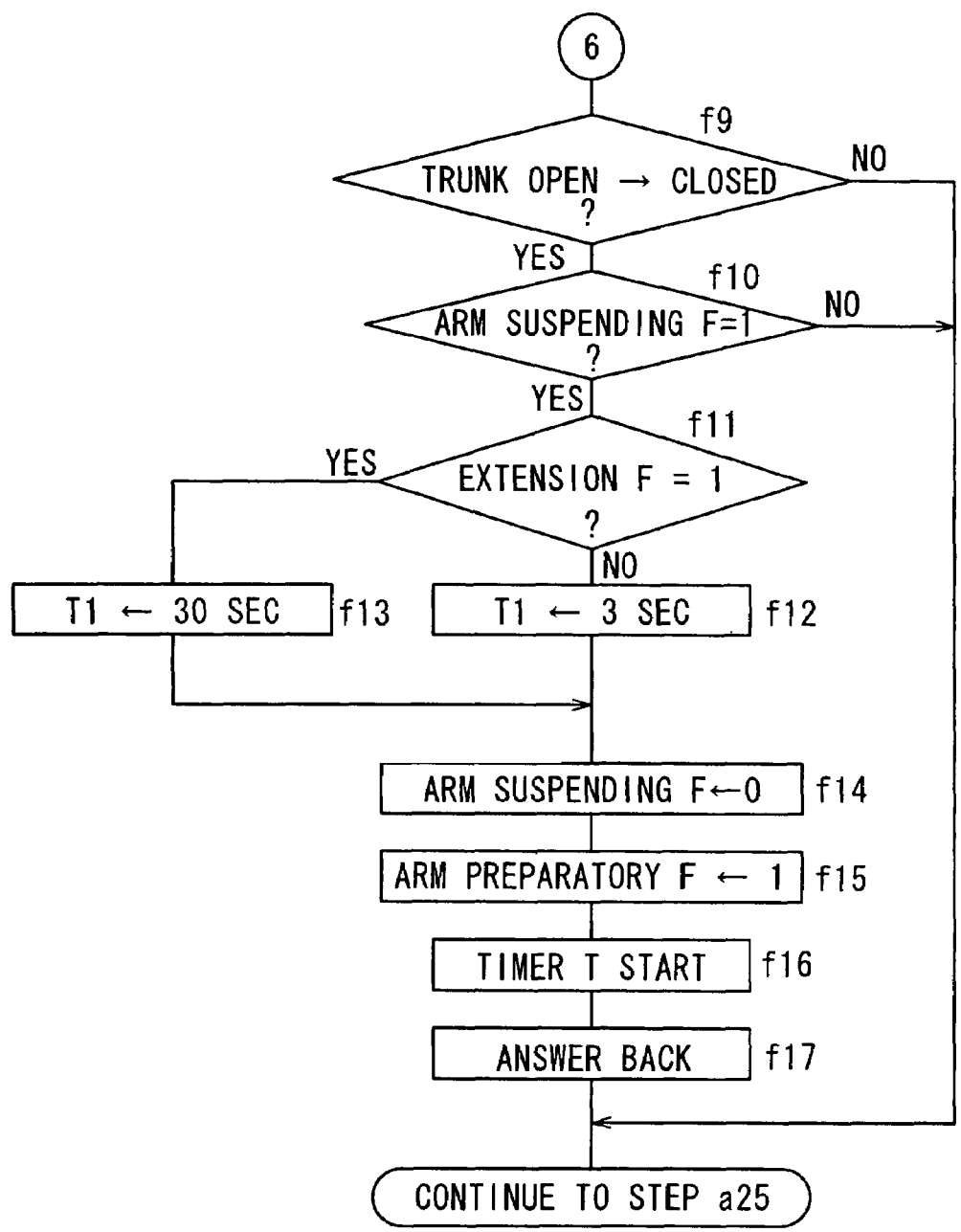
Figure 13:
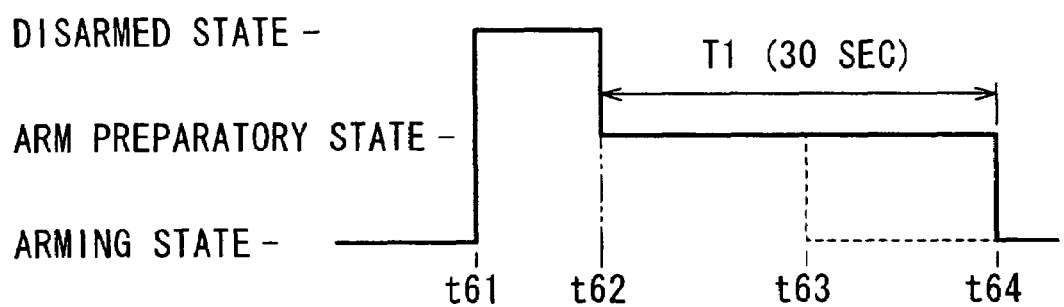
FIG. 13 is a timing chart for explaining operations of the antitheft ECU, showing one example with a vibration detecting portion.
Figure 14:
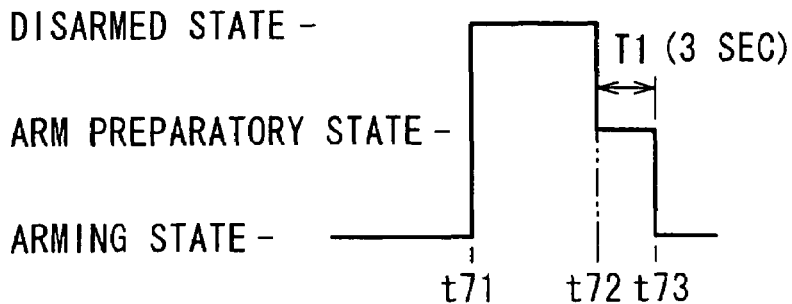
FIG. 14 is a timing chart for explaining operations of the antitheft ECU, showing one example without the vibration detecting portion.

FIGS. 12A and 12B are flowcharts showing a process conducted by the antitheft ECU 7 of the vehicle-mounted apparatus 2 mounted in the antitheft apparatus 1d according to the embodiment. The operations of the antitheft ECU 7 shown in FIGS. 12A and 12B are carried out to replace the above-described operations from Step a15 to a24 explained in association with FIGS. 2A through 2C. FIG. 13 is a timing chart for explaining the operations of the antitheft ECU 7, showing one example with the vibration detecting portion 17. FIG. 14 is a timing chart for explaining the operations of the antitheft ECU 7, showing one example without the vibration detecting portion 17. The timing charts shown in FIG. 13 and FIG. 14 are associated with the operation of the antitheft ECU 7 shown in FIGS. 12A and 12B.

Step f1 is a process following, for example, the above-described Step a9 shown in FIG. 2A. At Step f1, the antitheft ECU 7 determines whether or not the intrusion sensor 8 is provided. When it is determined that the intrusion sensor 8 is provided, the process proceeds to Step f2, and when it is determined that no intrusion sensor is provided, the process proceeds to Step f3. At Step f2, the intrusion sensor 8 is provided and therefore, the antitheft ECU 7 makes an extension flag indicate 1 to set an extended state representing that the vibration detecting section 17 is provided. The process then proceeds to Step f5. Note that the extension flag indicates a value to represent an extended state with the vibration detecting section 17 or an extended state without the vibration detecting section 17, and indicates either 0 or 1. When the extended state has been set, the extension flag indicates 1, and when the extension state has not been set, the extension flag indicates 0. At Step f3, the antitheft ECU 7 determines whether or not the tilt sensor 9 is provided. When it is determined that the tilt sensor 9 is provided, the process proceeds to Step f4, and when it is determined that no tilt sensor is provided, the process proceeds to Step f5. At Step f4, the tilt sensor 9 is provided and therefore, the antitheft ECU 7 makes the extension flag indicate 1 so as to set the extended state representing that the vibration detecting section 17 is provided. The process then proceeds to Step f5.

At Step f5, the antitheft ECU 7 determines whether or not the status of trunk has been shifted from the closed state to the open state by a user. When it is determined that the status of trunk has been shifted to the open state, the process proceeds to Step f6, and when it is determined that the status of trunk has not been shifted to the open state, the process proceeds to Step f9. Note that the determination at Step f5 is made in such a manner that the status of trunk is determined as being shifted to the open state when the trunk open command given by way of the trunk open button Tr of the transmitter 3 is detected or when opening of the trunk effected by using the trunk key is detected by the trunk key switch 13. At Step f16, the antitheft ECU 7 determines whether or not the arm flag indicates 1, that is, whether or not the arming state has been set. When it is determined that the arm flag indicates 1, that is, when it is determined that the trunk is opened by regular means in the arming state, the antitheft ECU 7 makes the arm flag indicate 0 at Step f7 so that the disarmed state is set. Next, at Step f8, the antitheft ECU 7 makes the arm suspending flag indicate 1 in order to show that the arming state is temporarily interrupted by opening of the trunk through the regular means. The process then proceeds to Step f9.

At Step f9, the antitheft ECU 7 determines whether or not the status of trunk has been shifted from the open state to the closed state by a user. When it is determined that the status of trunk has been shifted to the closed state, the process proceeds to Step f10, and when it is determined that the status of trunk has not been shifted to the closed state, the process proceeds to Step a25 shown in FIG. 2C. At Step f10, the antitheft ECU 7 determines whether or not the arm suspending flag indicates 1. When it is determined that the arm suspending flag indicates 1, that is, when it is determined that the trunk has been opened by the regular means in the arming state and then its status has been shifted to the closed state, the process proceeds to Step f11. When it is determined that the arm suspending flag does not indicate 1, that is, when it is determined that the arm suspending state has not been set, the process proceeds to Step a25 shown in FIG. 2C.

At Step f11, the antitheft ECU 7 determines whether or not the extension flag indicates 1, that is, whether or not the vibration detecting section 17 is provided. When it is determined that the extension flag indicates 1, that is, when it is determined that the vibration detecting section 17 is provided, the process proceeds to Step f13, and when it is determined that the extension does not indicate 1, that is, when it is determined that the vibration detecting section 17 is not provided, the process proceeds to Step f12. At Step f12, the vibration detecting section 17 is not provided and therefore, the antitheft ECU 7 sets the length of preparatory period T1 to the second length of preparatory period T12, for example, 3 seconds. The process then proceeds to Step f14. At Step f13, the vibration detecting section 17 is provided and therefore, the antitheft ECU 7 sets the length of preparatory period T1 to the first length of preparatory period T11, for example, 30 seconds. The process then proceeds to Step f14.

At Step f14, the antitheft ECU 7 makes the arm suspending flag indicate 0. The process then proceeds to Step f15. At Step f15, the antitheft ECU 7 makes the arm preparatory flag indicate 1 in order to show that there has been set a temporal disarmed state involving opening and closing of the trunk in the arming state. The process then proceeds to Step f16. At Step f16, the antitheft ECU 7 starts a timer. The process then proceeds to Step f17. At Step f17, the antitheft ECU 7 gives answer back for informing a start of the temporal disarmed state lasting for a predetermined length of time. The process then proceeds to Step a25 shown in FIG. 2C.

As described above, the presence of at least either one of the intrusion sensor 8 and the tilt sensor 9 leads the extended state and causes the length of preparatory period T1 to be set to the first length of preparatory period T11, and the absence of the intrusion sensor 8 and the tilt sensor 9 causes the length of preparatory period T1 to be set to the second length of preparatory period T12 which is shorter than the first length of preparatory period T11.

With reference to FIG. 13, there will be described the operations performed in the case where the length of preparatory period T1 is set to the first length of preparatory period T11. Opening the trunk in the arming state at a time point t61 by means of the transmitter 3 lifts the arming state to set the arm suspending state. By setting the arm suspending state, there is brought a temporary disarmed state which is obtained by temporal interruption of the arming state attributable to opening of the trunk by regular means, resulting in the security-monitoring lifted state.

Subsequently, closing the trunk at a time point t62 sets the arm preparatory state indicating the temporary disarmed state involving opening and closing of the trunk in the arming state. At the time point t62, the timer is activated. And then, at a time point t64 after the elapse of the first length of preparatory period T11, for example, 30 seconds, counted by the timer, the arming state is automatically set, resulting in the security-monitoring state.

When a lock request is received again at a time point t63 included in a period where the arm preparatory state is maintained within the first length of preparatory period T11 after closure of the trunk following a shift in the status of trunk in the arming state from the closed state to the open state, the arming state is set as indicated with a broken line, resulting in the security-monitoring state.

With reference to FIG. 14, there will be described the operations performed in the case where the length of preparatory period T1 is set to the second length of preparatory period T12. Opening the trunk in the arming state at a time point t71 by means of the transmitter 3 lifts the arming state to set the arm suspending state. By setting the arm suspending state, there is brought a temporary disarmed state which is obtained by temporal interruption of the arming state attributable to opening of the trunk by regular means, resulting in the security-monitoring lifted state.

Subsequently, closing the trunk at a time point t72 sets the arm preparatory state indicating the temporary disarmed state involving opening and closing of the trunk in the arming state. At the time point t72, the timer is activated. And then, at a time point t73 after the elapse of the second length of preparatory period T12, for example, 3 seconds, the arming state is set, automatically resulting in the security-monitoring state.

In the embodiment, the length of second length of preparatory period T12 is set at 3 seconds in consideration of chattering effect of the trunk courtesy switch 11 caused in closing the trunk. However, the length of second length of preparatory period T12 may be set at 0 seconds if no chattering effect of the trunk courtesy switch 11 is caused.

Further, in the embodiment, the arming state may also be set in a moment of reception of the lock request given within the second length of preparatory period T12. Furthermore, when the lock request is given within the first and second length of preparatory periods, the arming state may not be set in a moment of reception of the lock request, but may be set after the elapse of the first and second lengths of preparatory period.

Next, an antitheft apparatus 1*e* according to a sixth embodiment of the invention will be described. The antitheft apparatus 1*e* according to the present embodiment is particularly similar to the antitheft apparatus 1 according to the first embodiment of the invention and characteristic in that the vibration detecting section 17 is not provided and that the theft in the arm preparatory state is detected.

Figure 15:
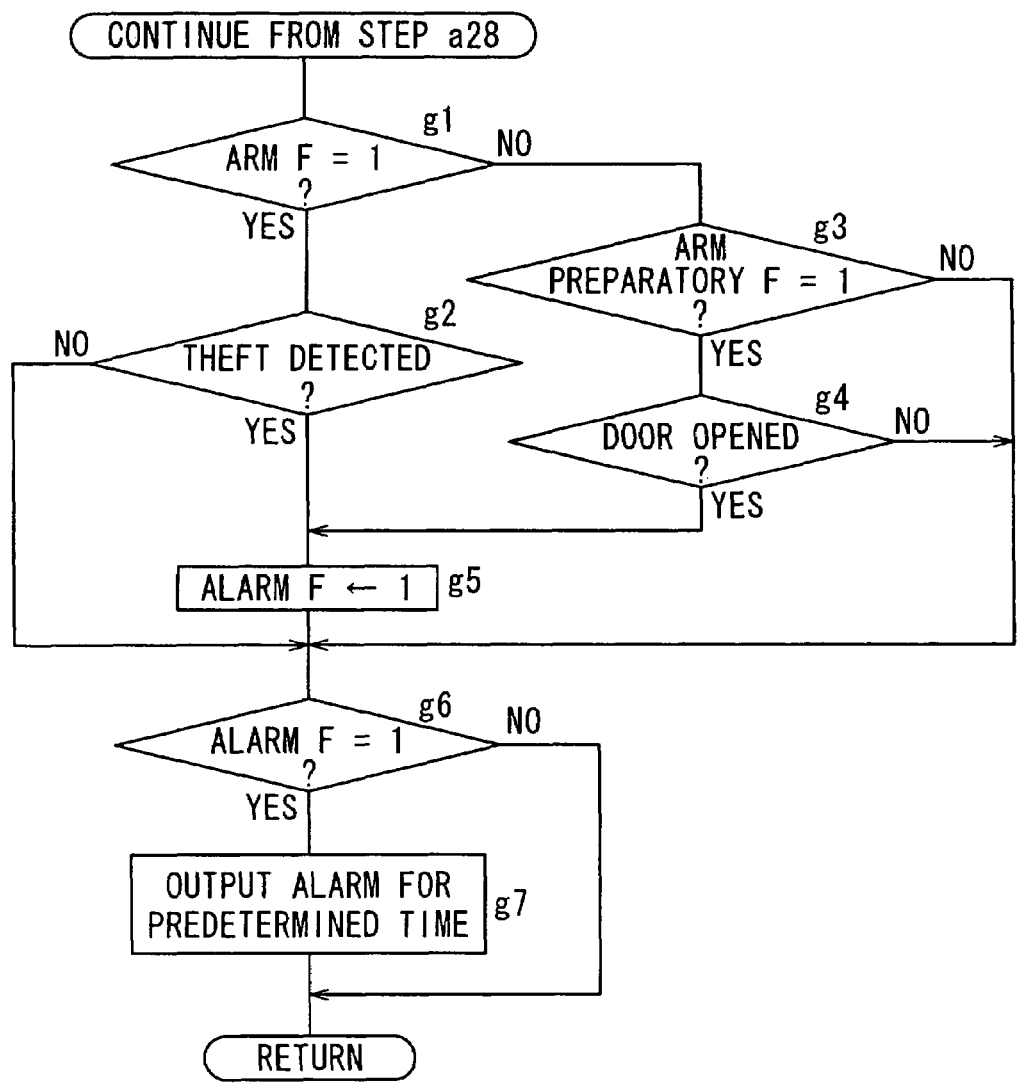
FIG. 15 is a flowchart showing a process conducted by an antitheft ECU of a vehicle-mounted apparatus provided in an antitheft apparatus according to a sixth embodiment of the invention.

FIG. 15 is a flowchart showing a process conducted by the antitheft ECU 7 of the vehicle-mounted apparatus 2 provided in the antitheft apparatus 1*e* according to the embodiment. The operations of the antitheft ECU 7 shown in FIG. 15 are carried out to replace the above-described operations from Step a29 to a33 explained in association with FIG. 2C.

Step g1 is a process following, for example, the above-described Step a28 shown in FIG. 2C, and is the same operation as that conducted at Step a29. That is to say, at Step g1, the antitheft ECU 7 determines whether or not the arm flag indicates 1. When it is determined that the arm flag indicates 1, the process proceeds to Step g2, and when it is determined that the arm flag does not indicate 1, the process proceeds to Step g3. At Step g2, on the basis of the information given by the sensor portion 5, the antitheft ECU 7 determines whether or not the theft has been detected. When it is determined that the theft has been detected, the process proceeds to Step g5, and when it is determined that no theft has been detected, the process proceeds to Step g6.

At Step g3, the antitheft ECU 7 determines whether or not the arm preparatory flag indicates 1. When it is determined that the arm preparatory flag indicates 1, that is, when it is determined that the temporal disarmed state has been set, the process proceeds to Step g4, and when it is determined that the arm preparatory flag does not indicate 1, the process proceeds to Step g6. At Step g4, on the basis of the information given by the sensor portion 5, the antitheft ECU 7 determines whether or not the status of door has been shifted from the closed state to the open state in the arm preparatory state. When it is determined that the status of door has been shifted to the open state, meaning that the theft has been detected, the process thus proceeds to Step g5, and when it is determined that the status of door has not been shifted to the open state, the process proceeds to Step g6. At Step g5, the theft has been detected and therefore, the antitheft ECU 7 makes the alarm flag indicate 1 so that the theft outbreak state is set. The process then proceeds to Step g6.

At Step g6, the antitheft ECU 7 determines whether or not the alarm flag indicates 1. When it is determined that the alarm flag indicates 1, that is, when it is determined that the theft outbreak state has been set, the process proceeds to Step g7, and when it is determined that the alarm flag does not indicate 1, that is, when it is determined that the theft outbreak state has not been set, the process returns to Step a1 shown in FIG. 2A. At Step g7, the antitheft ECU 7 makes the alarm output portion 6 output an alarm over a predetermined alarm period. The process then returns to Step a1 shown in FIG. 2A.

As described above, in the embodiment, the status change from the closed state to the open state of the door in the arm preparatory state, that is, in the temporal disarmed state, sets off the alarm as shown from Step g3 to Step g5. Accordingly, the antitheft ECU 7 conducts control of outputting an alarm when detecting the status change from the closed state to the open state of at least either one of the trunk and the door caused by the irregular means within the length of preparatory period T1. An alarm is thus outputted even in the disarmed state within the length of preparatory period T1 when the status of at least either one of the trunk and the door is undesirably shifted to the open state. Consequently, the security within the length of preparatory period T1 can be enhanced.

In the above-described embodiments, the luggage door is realized by the trunk. However, the luggage door is not limited to the trunk, and may be any door as long as it can open and block up a storage space of luggage room. The luggage door may be realized by a door on the vehicle rear side, for example.

In the above-described embodiments, the transmitter 3 is used as a keyless built-in security device. However, the keyless built-in security device is not limited to the transmitter 3. A transmitter having an arm button and a disarm button may be used to set the arming state within the length of preparatory period T1.

In the above-described embodiments, the object to be protected against theft is realized by the vehicle. However, the object to be protected against theft is not limited to the vehicle, and may be realized by other riding machines such as aircraft and ships. In the case of the ship, for example, the invention is preferably applied to the ship located on the ground.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An antitheft apparatus comprising:
a control section that conducts control of outputting an alarm when a theft is detected by a theft detecting section for detecting a theft of an object,
wherein, when a status change from a closed state to an open state of a luggage door through a luggage door unlock action with a key or by a luggage door open command transmitted by a transmitter is detected in an arming state being ready to output an alarm, the control section shifts a status from the arming state to a disarmed state being not ready to output an alarm;
when a status change from an open state to a closed state of a luggage door is detected in the disarmed state, the control section shifts the status from the disarmed state to the arming state after a predetermined length of preparatory period; and
when an arming command to shift the status from the disarmed state to the arming state is given within the predetermined length of preparatory period, the control section shifts the status from the disarmed state to the arming state,
the theft detecting section comprises a door detecting section for detecting an open state and a closed state of at least one of the luggage door and passenger doors,
when a status change from a closed state to an open state of the at least one of the luggage door and the passenger doors is detected by the door detecting section within the predetermined length of preparatory period, the control section conducts control of outputting an alarm.

2. The antitheft apparatus of claim 1, wherein the theft detecting section comprises a vibration detecting section of which output is influenced by vibration of the object to be protected against theft,
wherein, when the arming state is set within the predetermined length of preparatory period based on the arming command, the control section invalidates a value detected by the vibration detecting section during duration of a period until an elapse of the predetermined length of preparatory period.

3. The antitheft apparatus of claim 1, wherein the control section conducts control of outputting an alarm which is different from a period during duration of the predetermined length of preparatory period to a period after an elapse of the predetermined length of preparatory period.

4. The antitheft apparatus of claim 1, wherein the predetermined length of preparatory period is changeable.

5. The antitheft apparatus of claim 4, wherein the theft detecting section comprises a vibration detecting section of which output is influenced by vibration of the object to be protected against theft, wherein, in a case where the predetermined length of preparatory period has been modified to be shorter than a predetermined default period, the control section invalidates a value detected by the vibration detecting section during duration of a period until an elapse of the default period when the arming state is set within the predetermined length of preparatory period based on the arming command.

6. The antitheft apparatus of claim 4, wherein, in a case where the predetermined length of preparatory period has been modified to be shorter than a predetermined default period, the control section conducts control of outputting an alarm which is different from a period during duration of the predetermined length of preparatory period to a period after an elapse of the predetermined length of preparatory period.

7. An antitheft apparatus comprising:

a control section that conducts control of outputting an alarm when a theft is detected by a theft detecting section for detecting a theft; and a connection detecting section that detects whether or not a vibration detecting section of which output is influenced by vibration of an object to be protected against theft is connected to the control section, wherein, when a status change from a closed state to an open state of a door through an unlock action with a key or by an unlock command transmitted by a transmitter is detected in an arming state being ready to output an alarm, the control section shifts a status from the arming state to a disarmed state being not ready to output an alarm;

in a case where connection between the vibration detecting section and the control section is detected by the connection detecting section, the control section shifts the status from the disarmed state to the arming state after an elapse of a first length of preparatory period when a status change from an open state to a closed state of the door is detected in the disarmed state; and in a case where no connection between the vibration detecting section and the control section is detected by the connection detecting section, the control section shifts the status from the disarmed state to the arming state after an elapse of a second length of preparatory period which is shorter than the first predetermined length of preparatory period when the status change from an open state to a closed state of the door is detected in the disarmed state.

* * * * *